United States Patent
Li

(10) Patent No.: US 6,707,796 B1
(45) Date of Patent: Mar. 16, 2004

(54) SYSTEM DEVICE AND METHOD FOR REDUCING FORWARDING STATES IN A COMMUNICATION SYSTEM

(75) Inventor: Yunzhou Li, Lowell, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/307,190

(22) Filed: May 7, 1999

(51) Int. Cl.$^7$ .............................................. H04L 12/28
(52) U.S. Cl. ...................... 370/254; 370/351; 370/390; 370/401
(58) Field of Search ................................ 370/241, 216, 370/248, 242, 225, 227, 390, 400, 401, 392, 256, 252, 255, 408, 388, 351, 254; 709/238

(56) References Cited

U.S. PATENT DOCUMENTS

| | | | |
|---|---|---|---|
| 5,079,767 A | | 1/1992 | Perlman ..................... 370/94.3 |
| 5,331,637 A | | 7/1994 | Francis et al. ................. 370/54 |
| 5,892,924 A | * | 4/1999 | Lyon et al. ............ 395/200.75 |
| 5,940,391 A | * | 8/1999 | Malkin et al. ............... 370/390 |
| 6,018,771 A | * | 1/2000 | Hayden ....................... 709/231 |
| 6,101,549 A | * | 8/2000 | Baugher et al. ............ 709/238 |
| 6,141,347 A | * | 10/2000 | Shaughnessy et al. ...... 370/390 |
| 6,154,463 A | | 11/2000 | Aggarwal et al. .......... 370/408 |
| 6,389,532 B1 | * | 5/2002 | Gupta et al. .................. 713/60 |

OTHER PUBLICATIONS

Thaler et al., Internet Engineering Task Force (IETF) Internet Draft draft–ietf–idmr–gum–03.txt, Border Gateway Multicast Protocol (BGMP): Protocol Specification, Aug. 5, 1998.

Deering et al., Internet Engineering Task Force (IETF) Internet Draft draft–ietf–pim–v2–dm–02.txt, Protocol Independent Multicast Version 2 Dense Mode Specification, May 18, 1999.

Pusateri, T., Internet Engineering Task Force (IETF) Internet Draft draft–ietf–idmr–dvmrp–v3–08, Distance Vector Multicast Routing Protocol, Feb. 1999.

Moy, J., Internet Engineering Task Force (IETF) Request for Comments (RFC) 1584, Multicast Extensions to OSPF, Mar. 1994.

Aharoni et al., "Restricted Dynamic Steiner Trees For Scalable Multicast in Datagram Networks" Networking, US, IEEE Inc., New York vol. 6, No. 3, Jun. 1, 1998 pp. 286–297.

Batsell et al., "The Implications of a Distributed Computing Paradigm on Multicast Routing", Proceedings of the Military Communications Conference, US, New York, Nov. 6, 1995, pp. 241–245.

* cited by examiner

*Primary Examiner*—Duc Ho
(74) *Attorney, Agent, or Firm*—Steubing McGuinness & Manaras LLP

(57) ABSTRACT

A system, device, and method for reducing forwarding states in a network domain designates a forwarding device to forward multicast packets for the (source, group) pair. A number of (source, group) pairs may be aggregated to form an aggregated (source, group) pair that is rooted at the forwarding device. For each multicast packet forwarded by the forwarding device, the forwarding device inserts an option field identifying the forwarding device. Interior devices in the network domain forward multicast packets based upon at least the forwarding device identified in the option field of the multicast packet, particularly by maintaining a list of forwarding devices in the network domain and electing a designated forwarding device from which to receive multicast packets. The interior devices forward multicast packets received from the designated forwarding device, and drop multicast packets received from other forwarding devices.

86 Claims, 21 Drawing Sheets

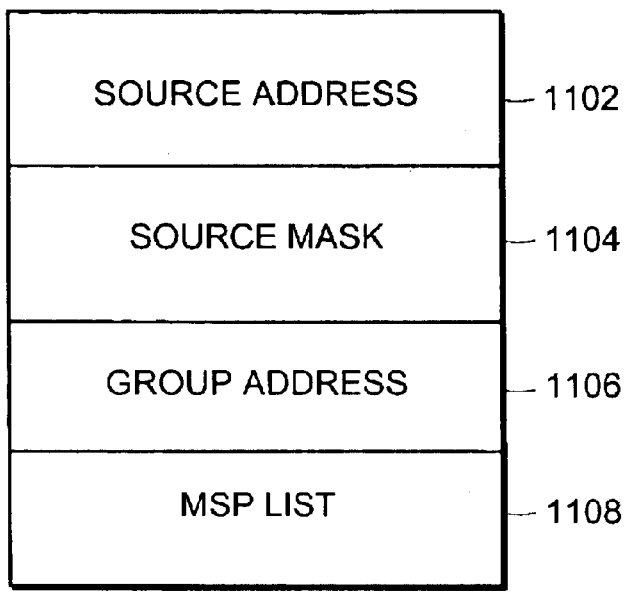
FIG. 11    1100
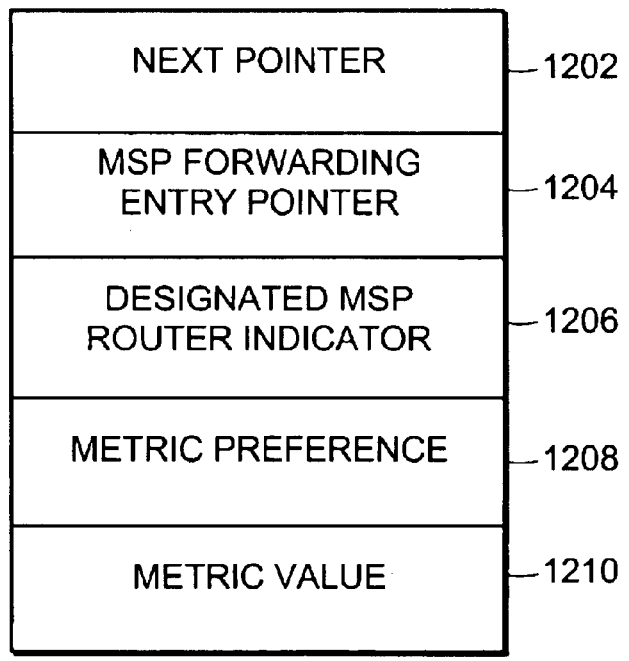
FIG. 12    1200

SYSTEM DEVICE AND METHOD FOR REDUCING FORWARDING STATES IN A COMMUNICATION SYSTEM

FIELD OF THE INVENTION

The present invention relates generally to communication networks, and, more particularly, to reducing forwarding states in a communication system.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network for multicast packets addressed to the multicast group.

In order to distribute multicast packets from a particular multicast source S to the multicast clients for a particular multicast group G, the multicast packet is routed through a number of multicast routers. For convenience, the path through the various multicast routers is referred to as the "multicast distribution tree" for the (source, group) pair. The multicast routers utilize a specific multicast routing protocol, such as Multicast Open Shortest-Path First (MOSPF), Distance Vector Multicast Routing Protocol (DVMRP), or Protocol Independent Multicast Dense Mode (PIM-DM), in order to determine the multicast distribution tree for the (source, group) pair.

Each multicast router in the multicast distribution tree for the (source, group) pair maintains state information relating to the (source, group) pair. Specifically, each multicast router maintains a multicast forwarding entry indicating the incoming interface over which packets for the (source, group) pair are accepted as well as the outgoing interface(s) over which the packets for the (source, group) pair are forwarded.

In a typical communication network, it is not uncommon for a multicast group to receive multicast information from multiple multicast sources. In such cases, each multicast router maintains state information for multiple (source, group) pairs. Unfortunately, the number of (source, group) pairs maintained by a multicast router has a direct impact on performance in the multicast communication network. In a MOSPF router, the number of Dijikstra calculations performed by the router is directly proportional to the number of (source, group) pairs maintained by the router. In a DVMRP router, the number of graft/prune message pairs used to join/leave the multicast groups is directly proportional to the number of (source, group) pairs maintained by the router. In a PIM-DM router, the number of graft/prune message pairs used to join/leave the multicast groups is directly proportional to the number of (source, group) pairs maintained by the router.

It is therefore desirable to reduce the number of (source, group) pairs maintained by the multicast routers. Reducing the number of (source, group) pairs in a MOSPF router reduces the number of Dijikstra calculations performed by the MOSPF router, thereby reducing the processing load on the MOSPF router. Reducing the number of (source, group) pairs in a DVMRP router reduces the number of graft/prune message pairs used by the DVMRP router to join/leave a multicast group, thereby reducing the traffic load in the DVMRP network and providing better stability in the DVMRP network. Reducing the number of (source, group) pairs in a PIM-DM router reduces the number of graft/prune message pairs used by the PIM-DM router to join/leave a multicast group, thereby reducing the traffic load in the PIM-DM network and providing better stability without intermittent data loss in the PIM-DM network.

Thus, a need has remained for a technique that reduces the number of (source, group) pairs maintained by the multicast router.

SUMMARY OF THE INVENTION

In accordance with one aspect of the invention, a number of (source, group) pairs are aggregated into an aggregate (source, group) pair rooted at a border device in a network domain, and interior devices join the aggregate (source, group) pair by running multicast protocol on the aggregate (source, group) pair and forwarding multicast packets based upon a forwarding entry for the aggregate (source, group) pair.

In accordance with another aspect of the invention, a device that forwards a multicast packet for the (source, group) pair inserts an option field into the multicast packet identifying the forwarding device. Each interior device determines whether to accept the multicast packet based upon at least the forwarding device identified in the option field of the multicast packet.

In accordance with yet another aspect of the invention, a multicast source proxy router determines whether to forward a multicast packet for the (source, group) pair. The multicast source proxy router maintains a list of multicast source proxy routers in the network domain, and elects one of the multicast source proxy routers as the designated multicast source proxy router for the (source, group) pair. The multicast source proxy router forwards multicast packets for the (source, group) pair if the multicast source proxy router determines itself to be the designated multicast source proxy router for the (source, group) pair, and includes in the forwarded multicast packet an option field identifying the multicast source proxy router.

In accordance with still another aspect of the invention, an interior router determines whether to accept a multicast packet from a multicast source proxy router. The interior router maintains a list of multicast source proxy routers in the network domain, and elects one of the multicast source proxy routers as the designated multicast source proxy router for the (source, group) pair. The interior router accepts multicast packets from the designated multicast source proxy router, and drops multicast packets from other multicast source proxy routers.

In accordance with yet another aspect of the invention, a security broker that forwards unencrypted (native) multicast packets inserts an option field into a multicast packet

BRIEF DESCRIPTION OF THE DRAWINGS

The foregoing and other objects and advantages of the invention will be appreciated more fully from the following further description thereof with reference to the accompanying drawings wherein:

FIG. 11 is a block diagram showing the relevant fields of an Index Entry in accordance with an embodiment of the present invention;

FIG. 12 is a block diagram showing the relevant fields of an MSP Entry in accordance with an embodiment of the present invention;

DETAILED DESCRIPTION OF A PREFERRED EMBODIMENT

Figure 1:
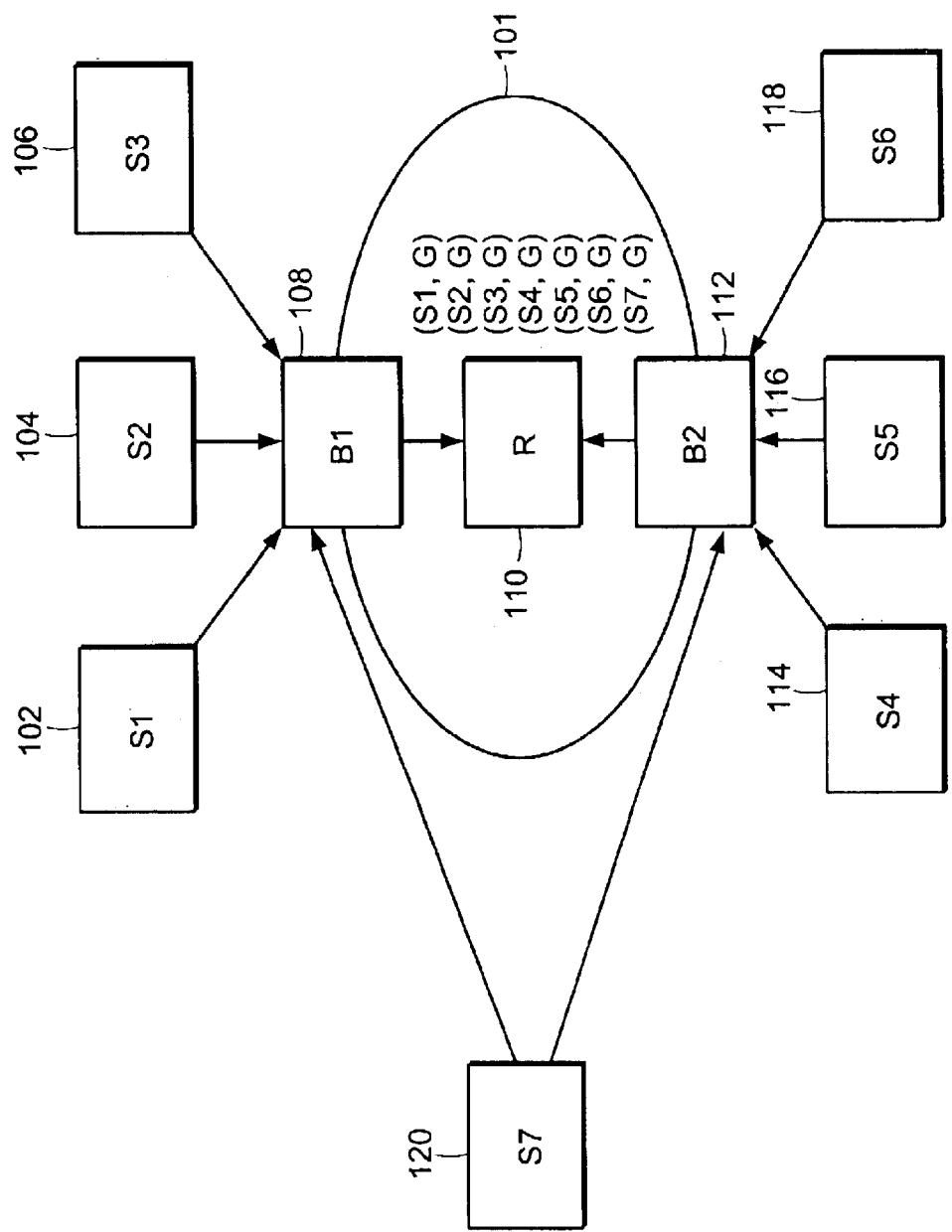
FIG. 1 is a block diagram showing an exemplary multicast communication network as is known in the art.

As described above, a need has remained for a technique that reduces the number of (source, group) pairs maintained by Interior Routers within a routing domain. Therefore, a border router in the routing domain (referred to hereinafter as a "Multicast Source Proxy" or "MSP" router) acts as a single multicast source on behalf of a number of (source, group) pairs that have a common multicast group, effectively aggregating the number of (source, group) pairs into a single (source, group) pair rooted at the MSP Router. For convenience, the aggregated (source, group) pair is referred to hereinafter as the (MSP, group) pair. Interior Routers within the routing domain run multicast protocols and route packets based on the (MSP, group) pair rather than on the constituent (source, group) pairs. Therefore, the Interior Routers need only maintain state information for the single (MSP, group) pair rather than maintaining state information for each of the constituent (source, group) pairs.

More specifically, each of the border routers in the routing domain can be a candidate for acting as the single multicast source on behalf of the number of (source, group) pairs. For convenience, the border routers in the routing domain are referred to hereinafter as "Multicast Source Proxy" or "MSP" Routers, and the MSP Router that acts as the single multicast source on behalf of the number of (source, group) pairs is referred to hereinafter as the "Designated MSP Router" for the (source, group) pair. The Designated MSP Router is elected dynamically using a predetermined priority scheme (described in detail below). In a steady state of operation, only the Designated MSP Router forwards multicast packets for the (source, group) pair. However, at various times, an MSP Router other than the Designated MSP Router may forward multicast packets for the (source, group) pair.

When an MSP Router forwards a multicast packet for the (source, group) pair, the MSP Router inserts a novel MSP Option field into the multicast packet. The MSP Option field includes, among other things, the address of the MSP Router that forwarded the multicast packet. The MSP Option field indicates to the other routers in the routing domain that the (source, group) pair is under MSP control. The various MSP Routers in the routing domain utilize the information contained in the MSP Option field of various multicast packets in order to elect the Designated MSP Router from among the various MSP Routers in the routing domain. Likewise, the Interior Routers within the routing domain utilize the information contained in the MSP Option field of various multicast packets in order to determine the Designated MSP Router. An Interior Router only accepts (and forwards) multicast packets that are received from the Designated MSP Router, and drops multicast packets that are received from the other MSP Routers.

The MSP techniques of the present invention can be applied to various applications. One exemplary application, which is described in detail below, is a multicast source proxy application that uses MSP techniques to reduce the number of (source, group) pairs maintained by Interior Routers within a routing domain. It is anticipated that the use of MSP techniques in a multicast source proxy application will be adopted as a multicast routing standard, so the substantive text of a proposed Internet Engineering Task Force (IETF) draft is included herein. Another exemplary application, which is described in detail below, is a hierarchical multicast security application that uses MSP techniques to solve a particular problem in a heretical multicast security (HMS) networking model. Various alternative embodiments of the present invention are also described in detail below.

I. Multicast Source Proxy Application

FIG. 1 is a block diagram showing an exemplary multicast communication network 100 as is known in the art. All multicast packets for the multicast group G within the domain 101 are routed through one of the border routers B1 and B2. In this example, multicast information from the multicast sources S1, S2, and S3 is routed through the border router B1, while multicast information from the multicast sources S4, S5, and S6 is routed through the border router B2. Multicast information from the multicast source S7 is routed through one of the border routers B1 and B2, as determined by a multicast protocol. Interior Routers within the domain 101, such as the router R, maintain state information for each (source, group) pair. In this example, then, the Interior Router R maintains state information for the (source, group) pairs (S1,G), (S2,G), (S3,G), (S4,G), (S5,G), (S6,G), and (S7,G).

When a multicast router, such as the routers B1, B2, and R shown in FIG. 1, receives a multicast packet, the multicast router decides whether to forward the multicast packet or drop the multicast packet based upon a multicast distribution tree. Specifically, the multicast router runs a multicast protocol in order to determine the incoming interface and outgoing interface(s) for the (source, group) pair. The multicast router maintains a forwarding table containing a forwarding entry for the (source, group) pair.

Figure 2:
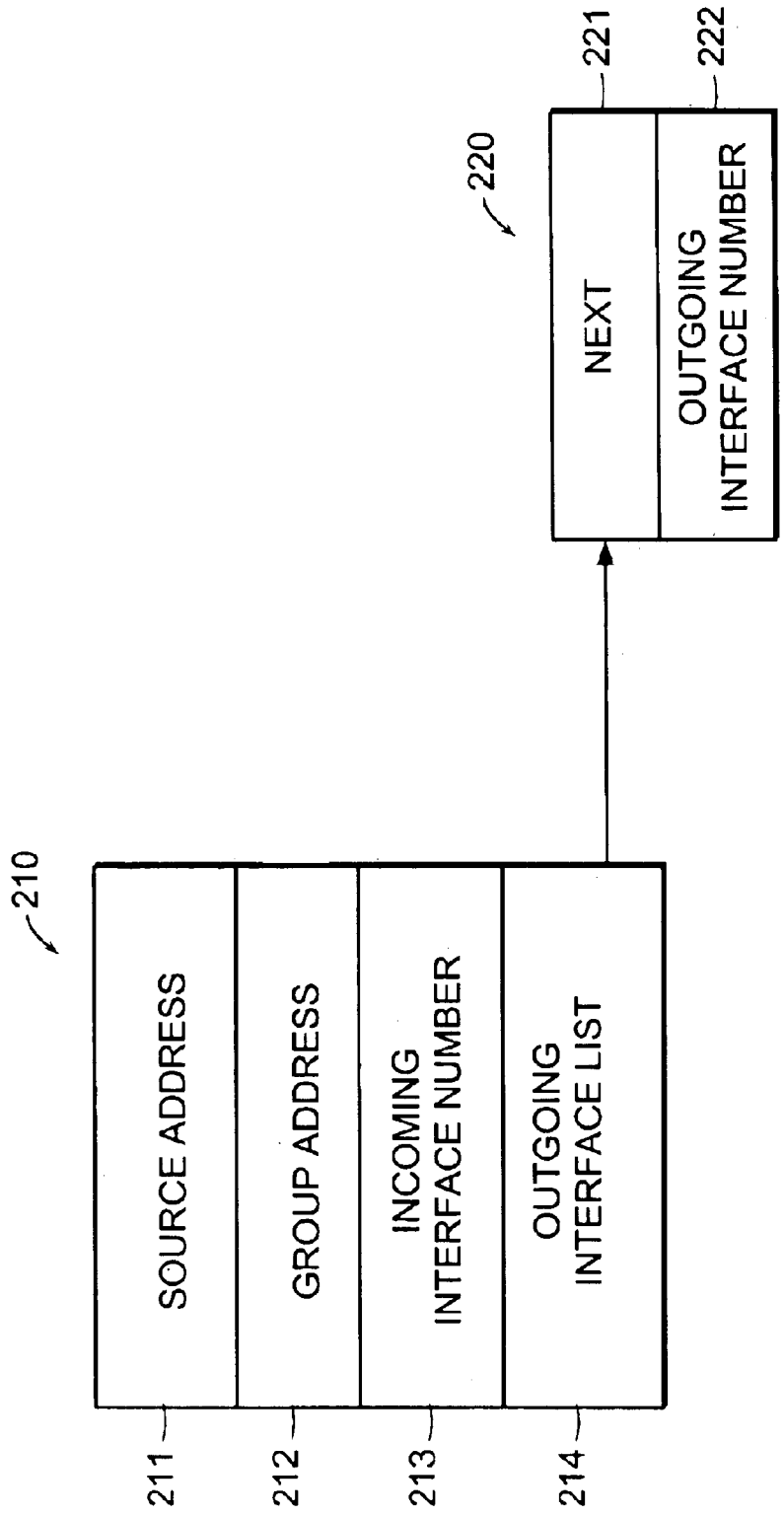
FIG. 2 is a block diagram showing the relevant fields of a forwarding entry as is known in the art.

FIG. 2 shows the relevant fields of a forwarding entry 210 in the forwarding table. The forwarding entry 210 includes, among other things, a Source Address field 211, a Group Address field 212, an Incoming Interface Number field 213, and an Outgoing Interface List field 214. The Source Address field 211 identifies the address of a multicast source. The Group Address field 212 identifies the multicast address for a multicast group. The Incoming Interface Number field 213 identifies the interface number from which the multicast router will accept multicast packets for the (source, group) pair. The Outgoing Interface List field 214 points to a first Outgoing Interface Descriptor 220 in a linked list of Outgoing Interface Descriptors, where the Outgoing Interface Descriptor 220 includes, among other things, a Next field 221 pointing to a next Outgoing Interface Descriptor in the linked list of Outgoing Interface Descriptors and an Outgoing Interface Number field 222 identifying the interface number of an outgoing interface over which multicast packets for the (source, group) pair are forwarded.

When the multicast router receives a multicast packet over a particular interface, the multicast router uses the corresponding forwarding entry to decide whether to accept the multicast packet from the particular interface, and also uses the forwarding entry to decide the outgoing interface(s), if any, over which to forward the multicast packet. Specifically, when the multicast router receives a multicast packet for a particular (source, group) pair over a particular interface, the multicast router searches its forwarding table for a forwarding entry 210 corresponding to the (source, group) pair, and particularly for a forwarding entry 210 having a Source Address field 211 equal to the source address from the multicast packet and a Group Address field 212 equal to the group address from the multicast packet.

If the multicast router does not find the forwarding entry 210 corresponding to the (source, group) pair, then the multicast router creates the forwarding entry 210 in the forwarding table. In order to create the forwarding entry 210 for the (source, group) pair, the multicast router first determines the incoming interface and outgoing interface(s) for the (source, group) pair by running a multicast protocol, such as MOSPF, DVMRP, or PIM-DM. The multicast router then creates the forwarding entry 210 including the Source Address field 211 equal to the source address, the Group Address field 212 equal to the group address, and the Incoming Interface Number field 213 indicating the incoming interface for the (source, group) pair. The multicast router also creates the linked list of outgoing interface descriptors including an outgoing interface descriptor 220 for each outgoing interface.

After finding or creating the forwarding entry 210 for the (source, group) pair, the multicast router determines whether to accept the multicast packet from the interface over which the multicast packet was received. The multicast router accepts the multicast packet if the Incoming Interface Number field 213 matches the incoming interface for the multicast packet, and otherwise drops the multicast packet. Assuming the multicast router accepts the multicast packet, then the multicast router forwards the multicast packet over each outgoing interface listed in the Outgoing Interface List field 214.

Figure 3:
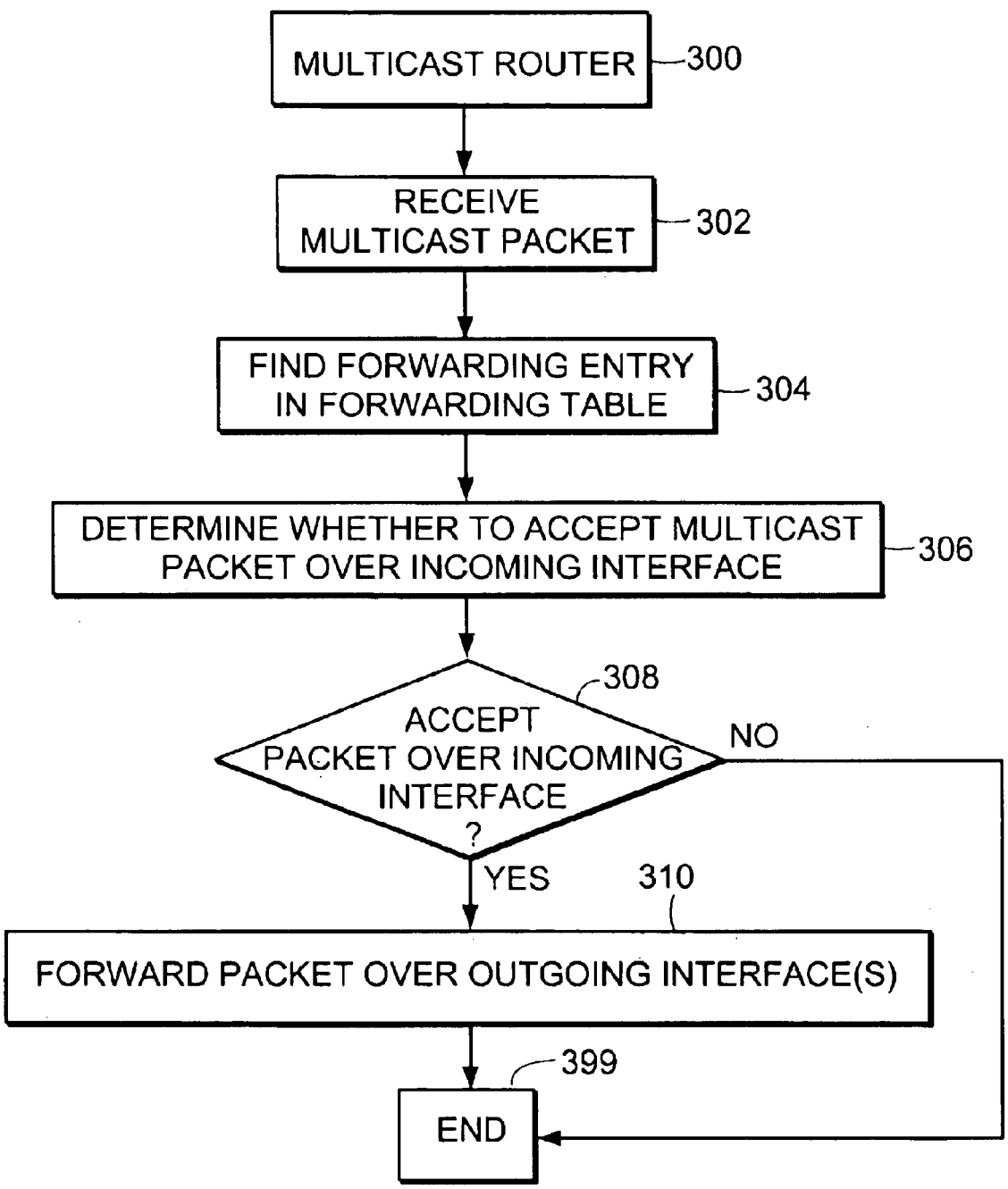
FIG. 3 is a logic flow diagram showing exemplary multicast router logic for processing a multicast packet.

FIG. 3 is a logic flow diagram showing exemplary multicast router logic 300 for processing a multicast packet. Upon receiving a multicast packet, in step 302, the multicast router proceeds to find (or create) a forwarding entry for the (source, group) pair, in step 304. The multicast router then determines whether to accept the multicast packet over the incoming interface, specifically by determining whether the Incoming Interface Number field 213 in the forwarding entry 210 matches the incoming interface for the multicast packet. If the multicast router accepts the multicast packet over the incoming interface (YES in step 308), then the multicast router forwards the multicast packet over each of the outgoing interfaces listed in the Outgoing Interface List field 214 of the forwarding entry 210, in step 310. If the multicast router does not accept the multicast packet over the incoming interface (NO in step 308), then the multicast router does not forward the multicast packet. The logic terminates in step 399.

Figure 4:
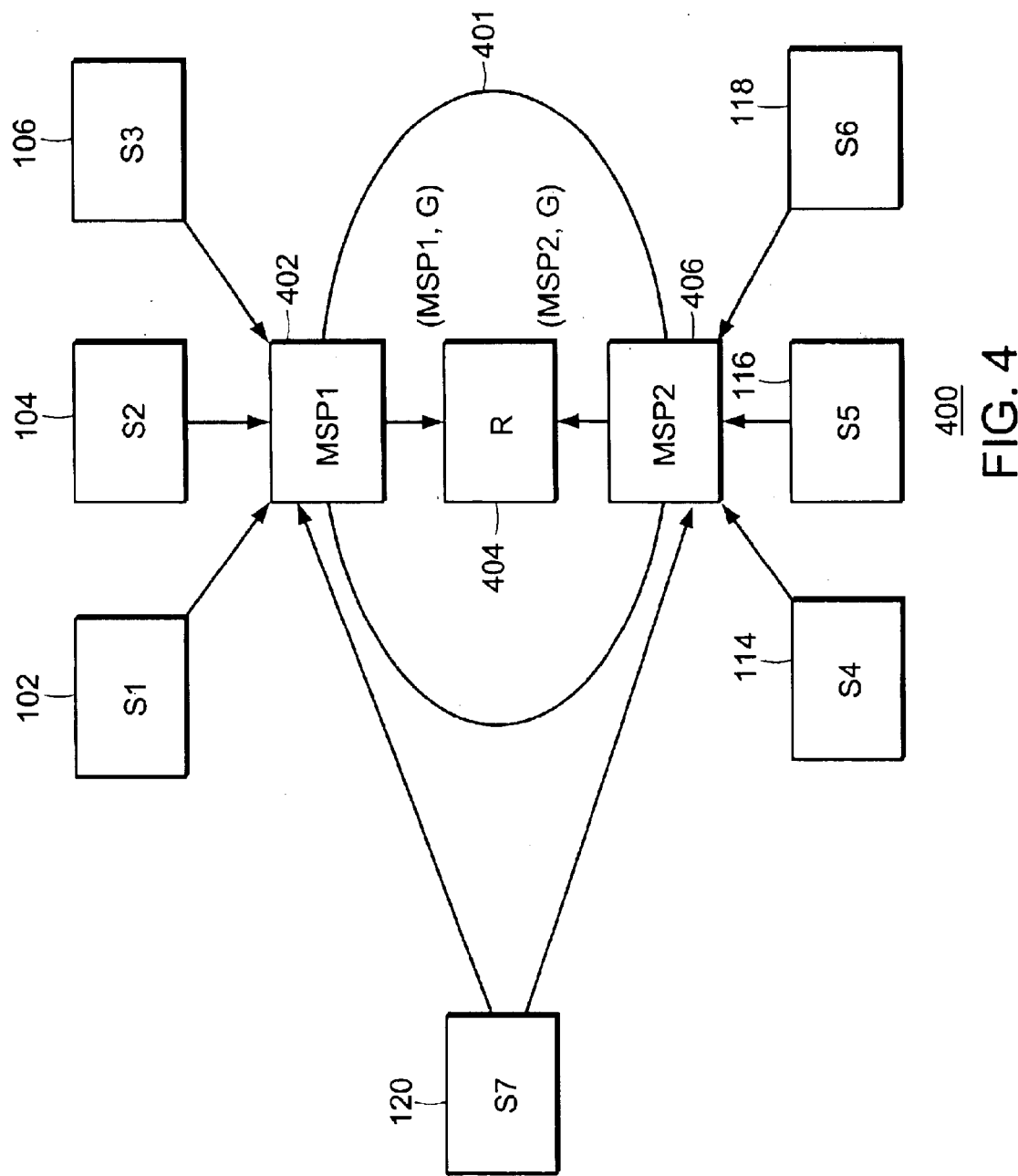
FIG. 4 is a block diagram showing an exemplary multicast communication network in accordance with an embodiment of the present invention.

FIG. 4 is a block diagram showing an exemplary multicast communication network 400 in which the multicast distribution trees for a number of (source, group) pairs are re-rooted at MSP Routers in accordance with the present invention. All multicast packets for the multicast group G within the domain 101 are routed through one of the MSP Routers MSP1 and MSP2. In this example, there are seven (7) multicast sources in the multicast communication network 400, namely S1, S2, S3, S4, S5, S6, and S7. Multicast information from the multicast sources S1, S2, and S3 is routed through the MSP Router MSP1. Therefore, in accordance with the present invention, the multicast distribution trees for the (source, group) pairs (S1,G), (S2,G), and (S3,G) are re-rooted at the MSP Router MSP1. Multicast information from the multicast sources S4, S5, and S6 is routed through the MSP Router MSP2. Therefore, in accordance with the present invention, the multicast distribution trees for the (source, group) pairs (S4,G), (S5,G), and (S6,G) are re-rooted at the MSP Router MSP2. Multicast information from the multicast source S7 is routed to both the MSP Router MSP1 and the MSP Router MSP2. Therefore, in accordance with the present invention, the multicast distribution tree for the (source, group) pair (S7,G) may be re-rooted at either the MSP Router MSP1 or the MSP Router MSP2. By re-rooting the multicast distribution trees for the individual (source, group) pairs at the MSP Routers MSP1 and MSP2, Interior Routers within the domain 101, such as the router R, maintain state information for the (source, group) pairs (MSP1,G) and (MSP2,G) rather than maintaining state information for the (source, group) pairs (S1,G), (S2,G), (S3,G), (S4,G), (S5,G), (S6,G), and (S7,G).

In order to re-root a subset of the multicast distribution tree at an MSP Router, each router in the routing domain, such as the MSP Routers MSP1 and MSP2 and the Interior Router R shown in FIG. 4, maintains a list of MSP Routers for the (source, group) pair, and elects one of the MSP Routers as a Designated MSP Router for forwarding multicast packets for the (source, group) pair based upon a predetermined priority scheme. In a preferred embodiment of the present invention, each of the MSP Routers is characterized by, among other things, a predetermined metric preference value and a predetermined metric that together indicate the relative desirability of the MSP Router as the Designated MSP Router for the (source, group) pair. In a preferred embodiment of the present invention, the metric is based upon the distance (i.e., the number of router hops) from the multicast source to the MSP Router. In accordance with the predetermined priority scheme, the Designated MSP Router is selected based upon the metric preference value, the metric, and the Internet Protocol (IP) address of each MSP Router. The MSP Router having the lowest metric preference value is preferred as the Designated MSP Router. Among MSP Routers having equal metric preference values, the MSP Router having the lowest metric (i.e., the number of router hops to the multicast source) is preferred as the Designated MSP Router. Among MSP Routers having equal metric preference values and equal metrics, the MSP Router having the lowest Internet Protocol (IP) address is preferred as the Designated MSP Router.

Each MSP Router, such as the MSP Routers MSP1 and MSP2 shown in FIG. 4, independently decides whether or not to forward multicast packets for a particular (source, group) pair. As discussed above, each MSP Router maintains a list of MSP Routers, and elects one of the MSP Routers as the Designated MSP Router for forwarding multicast packets for the particular (source, group) pair. If a particular MSP Router determines itself to be the Designated MSP Router, then that particular MSP Router forwards multicast packets for the (source, group) pair. Otherwise, that particular MSP Router does not forward multicast packets for the (source, group) pair.

When an MSP Router forwards a packet for the (source, group) pair, that MSP Router inserts a MSP Option field into the multicast packet. The MSP Option field indicates to the other multicast routers within the routing domain that the (source, group) pair is under MSP control, and includes the MSP Router address so that the other multicast routers within the routing domain can determine which MSP Router forwarded the multicast packet.

Figure 5:
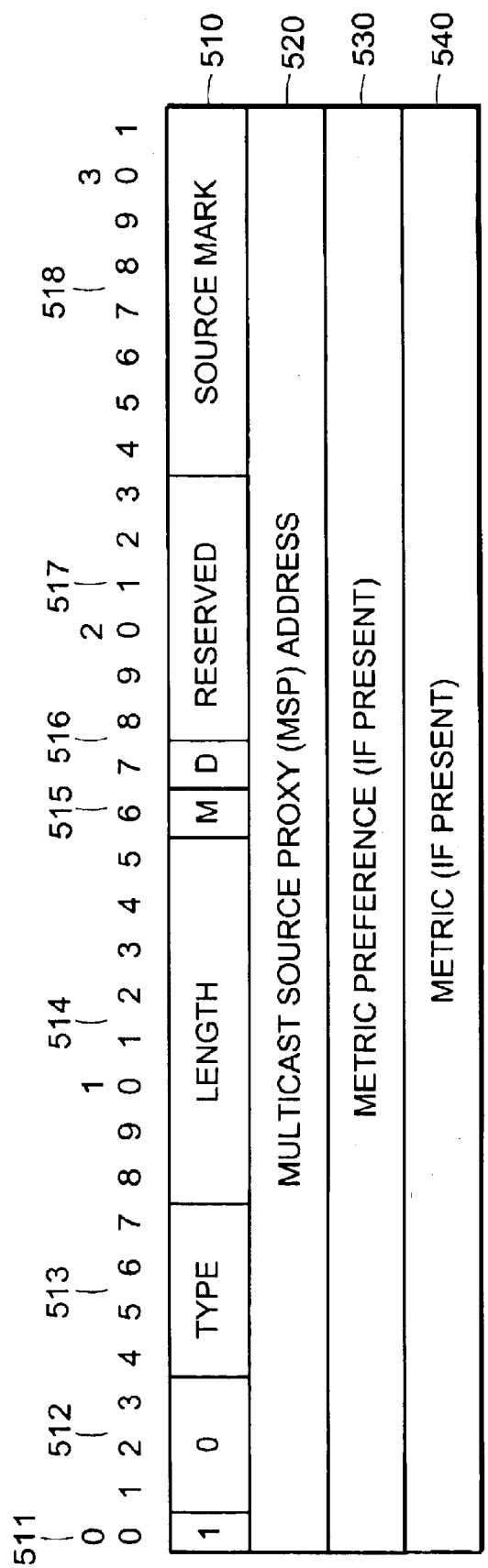
FIG. 5 is a block diagram showing the relevant fields of a Multicast Source Proxy Option field in accordance with an embodiment of the present invention.

FIG. 5 shows the format of a preferred MSP Option field 500 in accordance with the present invention. The MSP Option field 500 includes an MSP Option Header field 510 and an MSP Address field 520, and optionally includes a Metric Preference field 530 and a Metric Value field 540. The MSP Option Header field 510 includes, among other things, the Source Mask field 518 for indicating the number of significant leading bits in a source address of a multicast packet (described in detail below). The MSP Option Header field 510 also includes a Metric Indicator (M) field 515 that, when set to the value one (1), indicates that the Metric Preference field 530 and the Metric Value field 540 are present in the MSP Option field 500, and, when set to the value zero (0), indicates that the Metric Preference field 530 and the Metric Value field 540 are not present in the MSP Option field 500. The MSP Option Header field 510 further includes a Designate New MSP Router Indicator (D) field 516 that, when set to the value one (1), indicates that the routers should elect another MSP Router as the designated MSP Router due to a detected failure of the designated MSP Router (described in detail below).

Because each MSP Router independently decides whether or not to forward multicast packets for a particular (source, group) pair, it is possible for more than one MSP Router to forward packets for the particular (source, group) pair until the various MSP Routers "learn" about each other and elect a common Designated MSP Router. For example, with reference to FIG. 4, it is possible for both MSP1 and MSP2 to forward packets for S7 until MSP1 "learns" about MSP2 and MSP2 "learns" about MSP1, and both MSP1 and MSP2 elect one of the MSP Routers as the Designated MSP Router. An MSP Router "learns" about another MSP Router when the MSP Router receives a multicast packet including an MSP Option field inserted by the other MSP Router. When an MSP Router receives a multicast packet including an MSP Option field inserted by another MSP Router, the receiving MSP Router adds the other MSP Router to its list of MSP Routers, and determines whether the other MSP Router should become the Designated MSP Router according to a predetermined priority scheme (described in detail below). Once each of the MSP Router has "learned" about each of the other MSP Routers in the routing domain, each of the MSP Routers will have elected a common Designated MSP Router for the (source, group) pair, and only the Designated MSP Router will forward multicast packets for the (source, group) pair.

After an MSP Router elects a Designated MSP Router, it is possible for routing table changes to occur. Such routing table changes may alter the number of router hops between a particular multicast source and each of the MSP Routers in the routing domain, which in turn may alter each MSP Router's metric. However, in a preferred embodiment of the present invention, such routing table changes do not prompt the MSP Router to re-elect the Designated MSP Router.

Also after an MSP Router elects a Designated MSP Router, it is possible for the Designated MSP Router to fail. When the Designated MSP Router fails, it is necessary for all routers in the routing domain to elect a new Designated MSP Router from among the other MSP Routers in the routing domain. Therefore, in a preferred embodiment of the present invention, each MSP Router that detects the failure of the Designated MSP Router forwards multicast packets for the (source, group) pair including an MSP Option field with the D field 516 set to one (1) in order to inform the other routers in the routing domain that the Designated MSP Router has failed. Each router in the routing domain that receives a multicast packet including an MSP Option field with the D field 516 set to one (1) removes the Designated MSP Router from its list of MSP Routers, and then elects a new Designated MSP Router from among the remaining MSP Routers in the list of MSP Routers. Of course, there may be a transitional period during which multiple MSP Routers forward multicast packets for the (source, group) pair including an MSP Option field with the D bit 516 set to one (1). Therefore, in order to prevent each router from deleting the new Designated MSP Router and electing yet another Designated MSP Router for each such multicast packet, each router preferably starts a predetermined "blind timer" upon receiving a first multicast packet including an MSP Option field with the D field 516 set to one (1), and ignores the D bit 516 in subsequent multicast packets for the duration of the blind timer.

An MSP Option field is only valid within the particular routing domain of the MSP Router that inserted the MSP Option field. Therefore, it is preferable for each MSP Router to remove an MSP Option field from a multicast packet before forwarding that multicast packet to another routing domain. In this case, if an MSP Router receives a multicast packet from within the routing domain (referred to hereinafter as an "intradomain" multicast packet) that includes an MSP Option field, then the MSP Router removes the MSP Option field (after updating its list of MSP Routers) before forwarding the multicast packet to another routing domain. Consequently, if an MSP Router receives a multicast packet from outside of the routing domain (referred to hereinafter as an "interdomain" multicast packet) that includes an MSP Option field, then the MSP Router should drop the multicast packet. Alternatively, if an MSP Router receives an interdomain multicast packet that includes an MSP Option field, then the MSP Router may remove the MSP Option field from the multicast packet and process the multicast packet as if the multicast packet had been received without an MSP Option field.

Figure 6:
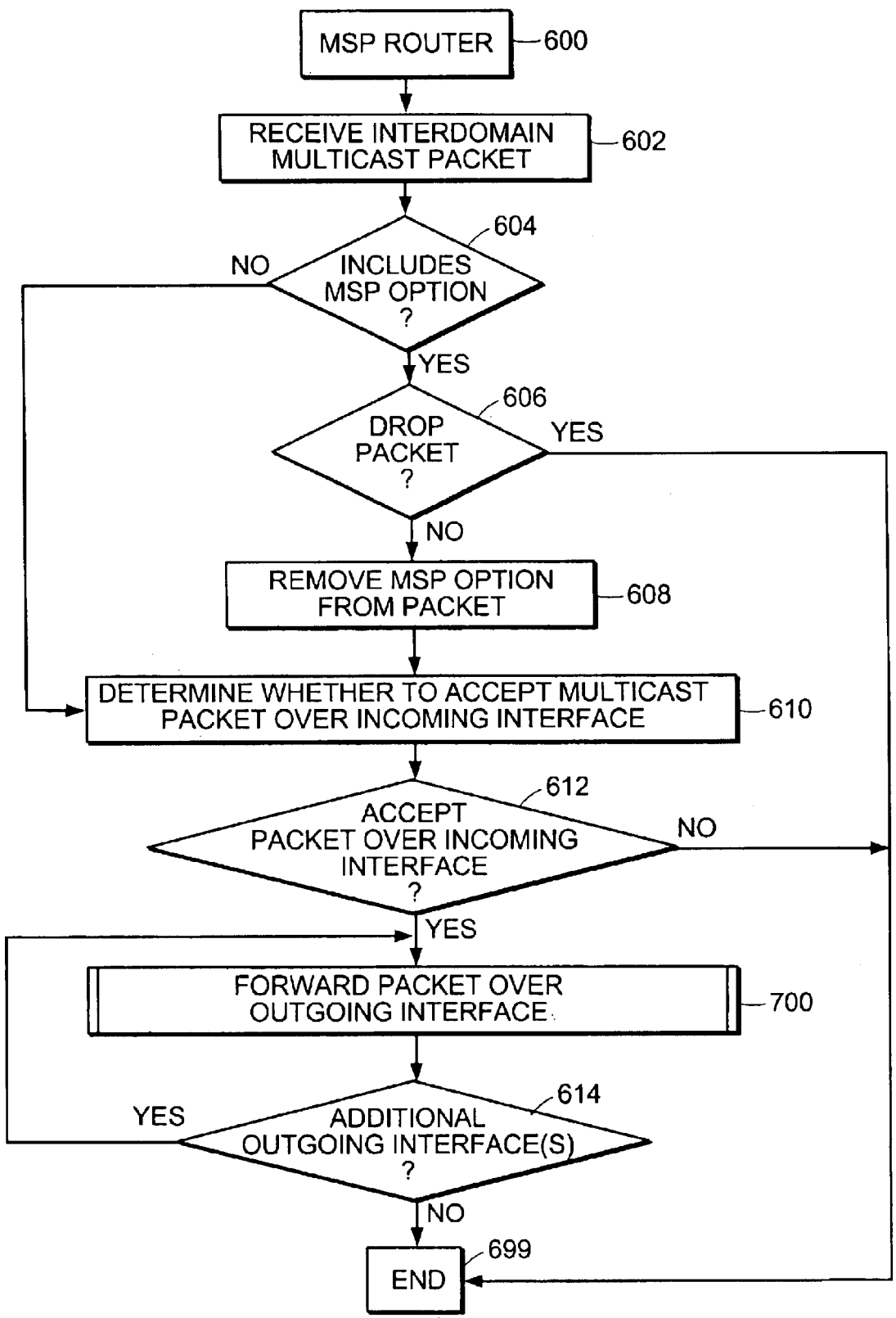
FIG. 6 is a logic flow diagram showing exemplary Multicast Source Proxy Router logic for processing an interdomain multicast packet in accordance with an embodiment of the present invention.

FIG. 6 is a logic flow diagram showing exemplary MSP Router logic for processing an interdomain multicast packet. Beginning at step 600, and upon receiving the interdomain multicast packet in step 602, the logic proceeds to determine whether the multicast packet includes an MSP Option field, in step 604. If the multicast packet does not include an MSP Option field (NO in step 604), then the logic proceeds to step 610. If the multicast packet does include an MSP Option field (YES in step 604), then the logic may drop the multicast packet or remove the MSP Option field and proceed as if the multicast packet was received without an MSP Option field. Therefore, in step 606, the logic determines whether the multicast packet should be dropped. If the logic determines that the multicast packet should be dropped (YES in step 606), then the logic terminates in step 699. If the logic determines that the multicast packet should not be dropped (NO in step 606), then the logic removes the MSP Option field from the multicast packet, in step 606, and proceeds to step 610.

In step 610, the logic determines whether the multicast packet should be accepted over the incoming interface, specifically by referring to the forwarding entry for the (source, group) pair. If the logic determines that the multicast packet should not be accepted over the incoming interface (NO in step 612), then the logic terminates in step 699. If the logic determines that the multicast packet should be accepted over the incoming interface (YES in step 612), then the logic forwards the multicast packet over each outgoing interface. Specifically, the logic forwards the multicast packet over an outgoing interface, in step 700 (described in detail with reference to FIG. 7 below), and repeats the forwarding logic of step 700 for each additional outgoing interface (YES in step 614). After forwarding the multicast packet over each outgoing interface (NO in step 614), the logic terminates in step 699.

Figure 7:
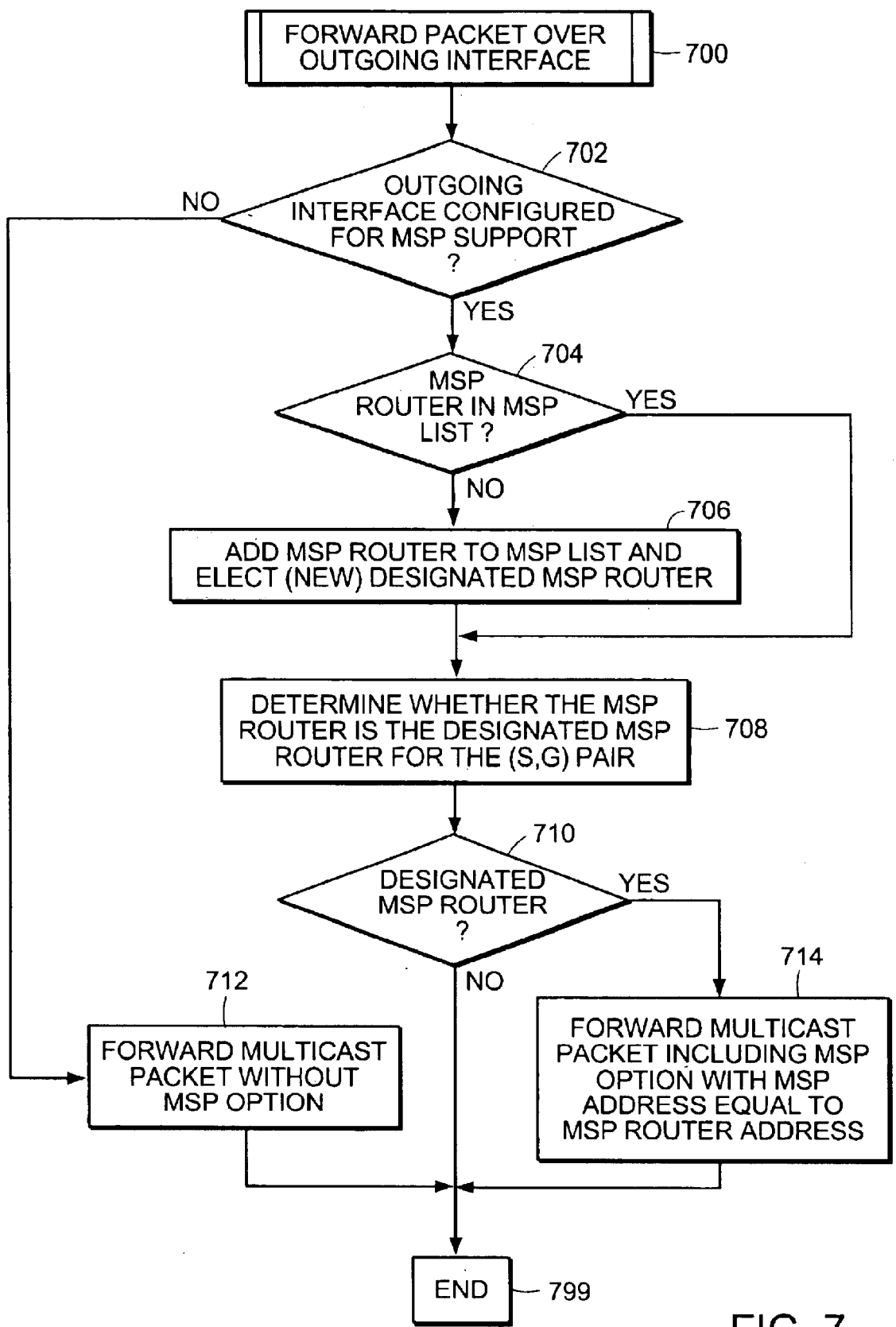
FIG. 7 is a logic flow diagram showing exemplary forwarding logic in accordance with an embodiment of the present invention.

FIG. 7 is a logic flow diagram showing exemplary forwarding logic 700. Beginning at step 700, the logic first determines whether the outgoing interface is configured for MSP support, in step 702. If the outgoing interface is not configured for MSP support (NO in step 702), then the logic forwards the multicast packet over the outgoing interface without an MSP Option field, in step 712, and terminates in step 799. If the outgoing interface is configured for MSP support (YES in step 702), then the logic proceeds to determine whether the MSP Router is in the list of MSP Routers, in step 704. If the MSP Router is in the list of MSP Routers (YES in step 704), then the logic proceeds to step 708. If the MSP Router is not in the list of MSP Routers (NO in step 704), then the logic adds the MSP Router to the list of MSP Routers and elects a (new) Designated MSP Router from among those MSP Routers in the list of MSP Routers, in step 706, and proceeds to step 708.

In step 708, the logic determines whether the MSP Router is the Designated MSP Router for the (source, group) pair. If the MSP Router is the Designated MSP Router for the (source, group) pair, then the logic forwards the multicast packet over the outgoing interface including an MSP Option field 500 with the MSP Address field 520 equal to the address of the MSP Router, in step 714, and terminates in step 799. If the MSP Router is not the Designated MSP Router for the (source, group) pair, then the logic terminates in step 799 without forwarding the multicast packet over the outgoing interface.

Figure 8:
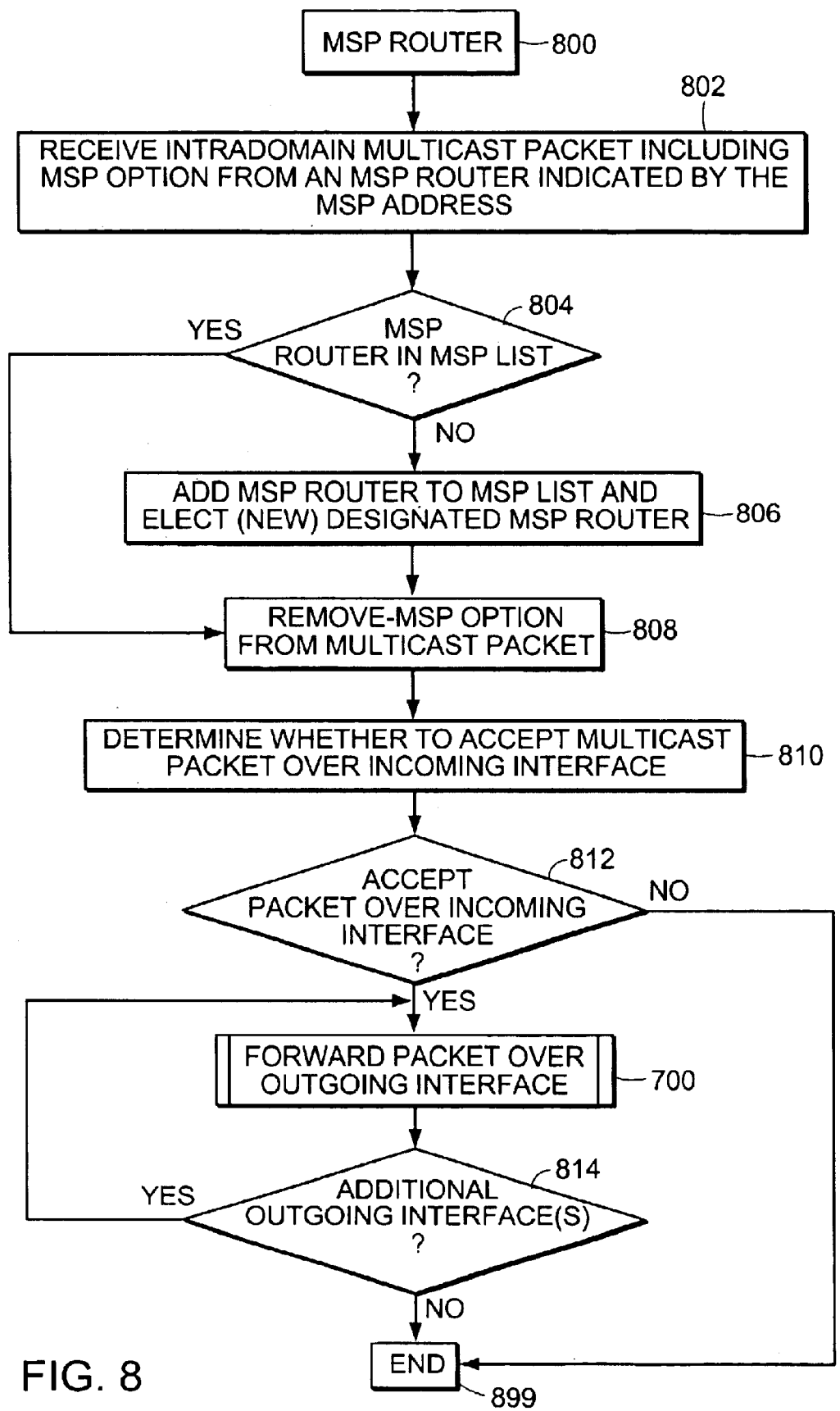
FIG. 8 is a logic flow diagram showing exemplary Multicast Source Proxy Router logic for processing an intradomain multicast packet in accordance with an embodiment of the present invention.

FIG. 8 is a logic flow diagram showing exemplary MSP Router logic for processing an intradomain multicast packet including an MSP Option field 500 from another MSP Router indicated by the MSP Address field 520. Beginning at step 800, and upon receiving the intradomain multicast packet including the MSP Option field 500 from another MSP Router indicated by the MSP Address field 520 in step 802, the logic first determines whether the indicated MSP Router is in the list of MSP Routers, in step 804. If the indicated MSP Router is in the list of MSP Routers (YES in step 804), then the logic proceeds to step 808. If the indicated MSP Router is not in the list of MSP Routers (NO in step 804), then the logic adds the indicated MSP Router to the list of MSP Routers and elects a (new) Designated MSP Router, in step 806, and proceeds to step 808.

In step 808, the logic removes the MSP Option field 500 from the multicast packet. The logic then determines whether the multicast packet should be accepted over the incoming interface, in step 810, specifically by referring to the forwarding entry for the (source, group) pair. If the logic determines that the multicast packet should not be accepted over the incoming interface (NO in step 812), then the logic terminates in step 899. If the logic determines that the multicast packet should be accepted over the incoming interface (YES in step 812), then the logic forwards the multicast packet over each outgoing interface. Specifically, the logic forwards the multicast packet over an outgoing interface, in step 700 (described in detail with reference to FIG. 7 above), and repeats the forwarding logic of step 700 for each additional outgoing interface (YES in step 814). After forwarding the multicast packet over each outgoing interface (NO in step 814), the logic terminates in step 899.

Each Interior Router, such as the Interior Router R shown in FIG. 4, joins the subset of the multicast distribution tree that is re-rooted at the Designated MSP Router by running the multicast protocol on the (MSP, group) pair rather than on the (source, group) pair. Specifically, each Interior Router maintains a list of MSP Routers, and elects one of the MSP Routers as the Designated MSP Router. The Designated MSP Router becomes the "source" for the (source, group) pair, and therefore each Interior Router runs the multicast protocol on the (MSP, group) pair in order to determine the incoming and outgoing interfaces for the (MSP, group) pair. Each Interior Router only accepts (and forwards) multicast packets that are received from the Designated MSP Router.

Therefore, when an Interior Router receives a multicast packet including an MSP Option field from a particular MSP Router, that Interior Router determines whether the indicated MSP Router is the Designated MSP Router for the (source, group) pair. If the indicated MSP Router is not in the list of MSP Routers maintained by the Interior Router, then the Interior Router adds the indicated MSP Router to the list of MSP Routers, and determines whether the indicated MSP Router is the (new) Designated MSP Router based upon a predetermined priority scheme (described in detail below). If the indicated MSP Router is determined to be the Designated MSP Router, then the Interior Router accepts the multicast packet and forwards the multicast packet according to an MSP forwarding entry (described in detail below). Otherwise, the Interior Router drops the multicast packet.

Figure 9:
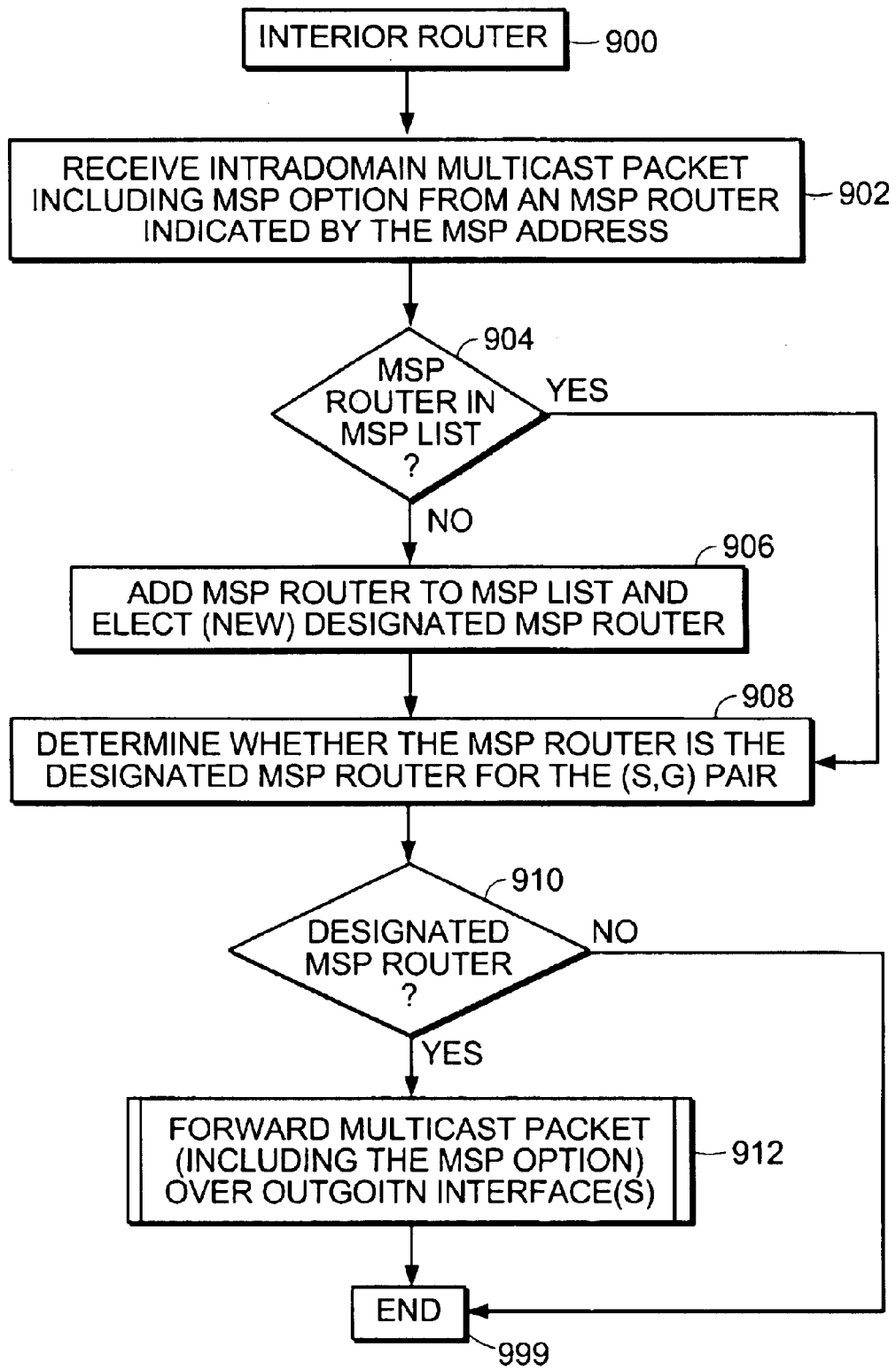
FIG. 9 is a logic flow diagram showing exemplary Interior Router logic for processing an intradomain multicast packet in accordance with an embodiment of the present invention.

FIG. 9 is a logic flow diagram showing exemplary Interior Router logic for processing an intradomain multicast packet including an MSP Option field 500 from an MSP Router indicated by the MSP Address field 520. Beginning at step 900, and upon receiving the intradomain multicast packet including the MSP Option field 500 from the MSP Router indicated by the MSP Address field 520 in step 902, the logic first determines whether the indicated MSP Router is in the list of MSP Routers, in step 904. If the indicated MSP Router is in the list of MSP Routers (YES in step 904), then the logic proceeds to step 908. If the indicated MSP Router is not in the list of MSP Routers (NO in step 904), then the logic adds the indicated MSP Router to the list of MSP Routers and elects a (new) Designated MSP Router, in step 906, and proceeds to step 908.

In step 908, the logic determines whether the indicated MSP Router is the Designated MSP Router for the (source, group) pair. If the indicated MSP Router is not the Designated MSP Router for the (source, group) pair (NO in step 910), then the logic terminates in step 999 without forwarding the multicast packet. If the indicated MSP Router is the Designated MSP Router for the (source, group) pair (YES in step 910), then the logic forwards the multicast packet (including the MSP Option field 500) over the outgoing interface(s) indicated by the MSP forwarding entry (described in detail below).

Because multicast packets can originate from within the routing domain, it is possible for an Interior Router to receive some multicast packets for the (source, group) pair that do not include an MSP Option field (that is, multicast packets that originated from an intradomain multicast source and therefore were not processed and forwarded by an MSP Router within the same routing domain). In this case, the Interior Router first determines whether the (source, group) pair is under MSP control (described in detail below). Assuming the (source, group) pair is under MSP control, then the Interior Router determines a relative priority for the intradomain multicast source and compares the relative priority for the intradomain multicast source to the relative priority of the Designated MSP Router in order to determine whether or not to forward the multicast packet. If the intradomain multicast source has a higher relative priority, then the Interior Router forwards the multicast packet (without an MSP Option field). Otherwise, the Interior Router drops the multicast packet.

Figure 10:
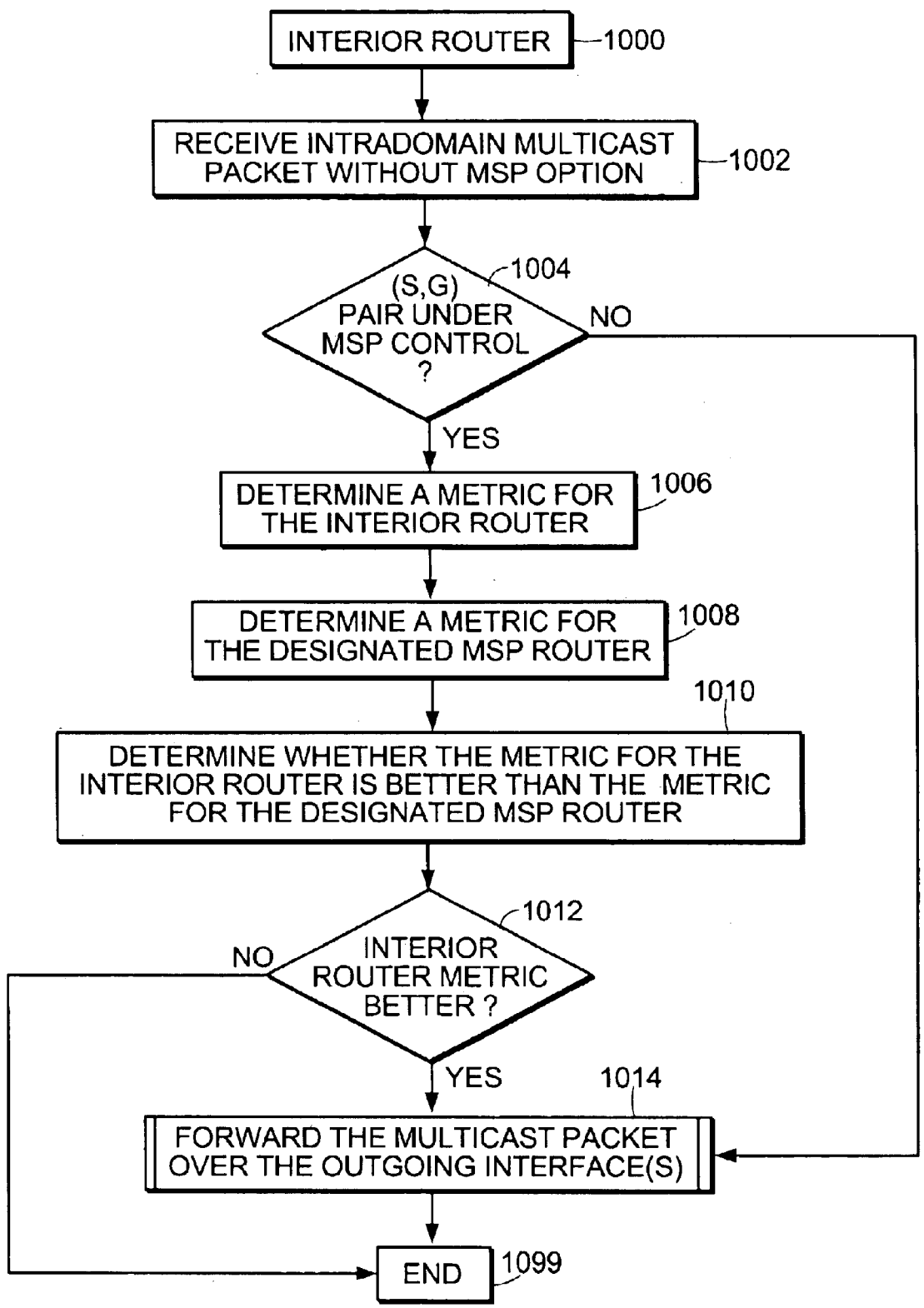
FIG. 10 is a logic flow diagram showing exemplary Interior Router logic for processing an intradomain multicast packet in accordance with an embodiment of the present invention.

FIG. 10 is a logic flow diagram showing exemplary Interior Router logic for processing an intradomain multicast packet without an MSP Option field 500. Beginning at step 1000, and upon receiving the intradomain multicast packet without the MSP Option field 500 in step 1002, the logic first determines whether the (source, group) pair is under MSP control, in step 1004. If the (source, group) pair is not under MSP control (NO in step 1004), then the logic forwards the multicast packet over the outgoing interface(s), in step 1014, and terminates in step 1099. If the (source, group) pair is under MSP control (YES in step 1004), then the logic determines a metric for the Interior Router, in step 1006, specifically by determining the number of router hops from the Interior Router to the multicast source. The logic also determines a metric for the Designated MSP Router, in step 1008, specifically by retrieving a metric that is maintained along with each MSP Router entry in the list of MSP Routers. The logic then determines whether the metric for the Interior Router is better than the metric for the Designated MSP Router, in step 1010, and particularly whether the metric for the Interior Router is less than the metric for the Designated MSP Router. If the metric for the Interior Router is not better than the metric for the Designated MSP Router (NO in step 1012), then the logic terminates in step 1099 without forwarding the multicast packet. If the metric for the Interior Router is better than the metric for the Designated MSP Router (YES in step 1012), then the logic forwards the multicast packet over the outgoing interface(s), in step 1014, and terminates in step 1099.

As described above with reference to FIG. 5, the MSP Option field 500 includes a Source Mask field 518 within the MSP Option Header field 510. When an MSP Router forwards a multicast packet including an MSP Option field, the MSP Router includes the source mask for the (source, group) pair in the Source Mask field 518 within the MSP Option Header field 510. This allows each Interior Router to maintain the source mask for the (source, group) pair. When an Interior Router receives a multicast packet including an MSP Option field, the Interior Router compares the source mask from the Source Mask field 518 with the source mask for the (source, group) pair, and sets the source mask for the (source, group) pair equal to the source mask from the Source Mask field 518 if the source mask from the Source Mask field 518 is more specific (i.e., greater) than the source mask for the (source, group) pair. In this way, the Interior Router is forced to use the most specific source mask for the (source, group) pair.

Although many alternative embodiments of the present invention are envisioned, one exemplary embodiment of the present invention utilizes an indexing scheme to maintain the list of MSP Routers. Specifically, for each (source, group) pair under MSP control, each router in the routing domain maintains an Index Entry (described in detail below) for the (source, group) pair and also maintains an MSP Entry (described in detail below) for each MSP Router that is associated with the (source, group) pair. Each MSP Entry is associated with an MSP forwarding entry in the forwarding table.

FIG. 11 shows the relevant fields of an Index Entry 1100 in accordance with an exemplary embodiment of the present invention. The Index Entry 1100 includes a Source Address field 1102, a Source Mask field 1104, a Group Address field 1106, and an MSP List field 1108. The Source Address field 1102 identifies the multicast source address for the (source, group) pair. The Group Address field 1106 identifies the multicast group address for the (source, group) pair. The Source Mask field 104 indicates the number of significant leading bits in the multicast source address of a multicast packet for the (source, group) pair. The MSP List field 1108 is a pointer to a first MSP Entry 1200 in a linked list of MSP Entries.

FIG. 12 shows the relevant fields of an MSP Entry 1200 in accordance with an exemplary embodiment of the present invention. The MSP Entry 1200 includes a Next Pointer field 1202, an MSP Forwarding Entry Pointer field 1204, a Designated MSP Router Indicator field 1206, a Metric Preference field 1208, and a Metric Value field 1210 The Next Pointer field 1202 is a pointer to a next MSP Entry 1200 in the linked list of MSP Entries. The MSP Forwarding Entry Pointer field 1204 is a pointer to a corresponding MSP forwarding entry in the forwarding table. The Designated MSP Router Indicator field 1206 indicates whether the corresponding MSP Router is the Designated MSP Router for the (source, group) pair. For convenience, the Designated MSP Router Indicator field 1206 is referred to as "ACCEPTED" if the corresponding MSP Router is the Designated MSP Router and "REJECTED" if the corresponding MSP Router is not the Designated MSP Router. The Metric Preference field 1208 indicates a relative preference for the corresponding MSP Router to be the Designated MSP Router, where the MSP Router having the lowest preference value is preferred as the Designated MSP Router. The Metric Value field 1210 contains the metric for the corresponding MSP Router (i.e., the number of hops from the MSP Router to the multicast source).

The MSP forwarding entry associated with the MSP Entry 1200 is a special forwarding entry for the (ASP, group) pair. The MSP forwarding entry has the same format as the forwarding entry 210 shown in FIG. 2, and includes, as the Source Address field 211, the address of the corresponding MSP Router rather than the address of the multicast source. For convenience, the Source Address field 211 of an MSP forwarding entry is referred to hereinafter as the MSP Address field 211.

Although the present invention may be implemented in various ways, one proposed implementation utilizes an index table to maintain the Index Entries and the MSP Entries, and utilizes the forwarding table to maintain the MSP forwarding entries. It should be noted, however, that the formats of the various entries as well as the separation of the entries into an index table and a forwarding table are purely implementational. Many alternative embodiments which utilize different entry formats and different tables are possible. For example, in one alternative embodiment, the index table and the forwarding table are combined into a single table so that all information for a particular MSP Router can be obtained from a single table lookup.

In an exemplary embodiment of the present invention, the Index Entries, MSP Entries, and MSP forwarding entries are used in conjunction with the forwarding entries in the forwarding table to re-root a subset of the multicast distribution tree at an MSP Router so that the Interior Routers can join the (MSP, group) pair rather than the individual (source, group) pairs.

Specifically, each MSP Router and Interior Router maintains an Index Entry 1100 for the (source, group) pair that is used to index a list of MSP Entries 1200. The router maintains an MSP Entry 1200 for each of a number of MSP Routers associated with the (source, group) pair. As described above, the Index Entry includes, among other things, the Source Mask field 1104 that is dynamically updated to match the most specific source mask associated with the (source, group) pair. Each MSP Entry 1200 includes, among other things, the Designated MSP Router Indicator field 1206 indicating whether the corresponding MSP Router is elected to forward multicast packets for the (source, group) pair. Each MSP Router elects a Designated MSP Router (either itself or another MSP Router) to forward multicast packets for the (source, group) pair based upon the predetermined priority scheme. Each Interior Router elects a Designated MSP Router from which to receive multicast packets for the (source, group) pair based upon the predetermined priority scheme. The Designated MSP Router may change, for example, when the router learns of additional MSP Router in the routing domain or when the Designated MSP Router fails.

Each MSP Router uses the Index Entry 1100 and the MSP Entries 1200 to determine whether to forward a multicast packet for the (source, group) pair. An MSP Router forwards a multicast packet for the (source, group) pair if that MSP Router is the Designated MSP Router, and otherwise will drop the multicast packet. For each packet forwarded by the MSP Router, the MSP Router inserts the MSP Option field 500 including, among other things, the MSP Address field 520 equal to the address of the MSP Router. The MSP Option field indicates to other routers that the (source, group) pair is under MSP control and that the MSP Router has, at least temporarily, become the root of a subset of the multicast distribution tree for the (source, group) pair.

Before each MSP Router is aware of all other MSP Routers in the routing domain, it is possible for more than one MSP Router to forward multicast packets for the (source, group) pair. This is because each MSP Router elects a Designated MSP Router from among those MSP Routers of which it is aware. When an MSP Router receives a multicast packet including the MSP Option field 500 from an unknown MSP Router indicated by the MSP Address field 520, the MSP Router creates an MSP Entry 1200 for the indicated MSP Router, and elects a (new) Designated MSP Router from among the MSP Routers in the list of MSP Routers.

Each Interior Router uses the Index Entry 1100 and the MSP Entries 1200 to determine whether to accept a multicast packet from a particular MSP Router. When the Interior Router receives a multicast packet including an MSP Option field 500 from a particular MSP Router, the Interior Router searches its list of MSP Entries for an MSP Entry 1200 corresponding to that particular MSP Router, specifically based upon the MSP Address field 520 included in the MSP Option field 500. Assuming the Interior Router finds an MSP Entry 1200 corresponding to the particular MSP Router, then the Interior Router determines whether the particular MSP Router is the Designated MSP Router for the (source, group) pair based upon the Designated MSP Router Indicator field 1206 in the MSP Entry 1200. If the particular MSP Router is the Designated MSP Router for the (source, group) pair, then the Interior Router forwards the multicast packet including the MSP Option field 500. If the particular MSP Router is not the Designated MSP Router for the (source, group) pair, then the Interior Router drops the multicast packet. However, assuming the Interior Router does not find an MSP Entry 1200 corresponding to the particular MSP Router, then the Interior Router creates an MSP Entry 1200 for the particular MSP Router and determines whether the particular MSP Router should be the Designated MSP Router based upon the predetermined priority scheme. If the particular MSP Router is determined to be the Designated MSP Router for the (source, group) pair, then the Interior Router forwards the multicast packet including the MSP Option field 500. If the particular MSP Router is not the Designated MSP Router for the (source, group) pair, then the Interior Router drops the multicast packet.

The MSP Option field 500 in a particular multicast packet is only valid for the routing domain within which the MSP Option field 500 was inserted. Therefore, an MSP Router that receives an intradomain multicast packet including an MSP Option field 500 preferably removes the MSP Option field 500 from the multicast packet before forwarding the multicast packet to another routing domain. An MSP Router that receives an interdomain multicast packet including an MSP Option field 500 either drops the packet or else removes the MSP Option field 500 and processes the multicast packet as if the multicast packet was received without the MSP Option field 500.

Because multicast packets can originate from within the routing domain, it is possible for an Interior Router to receive some multicast packets for the (source, group) pair that include an MSP Option field 500 (that is, an MSP Option field 500 inserted by an MSP Router within the same routing domain) and some multicast packets for the (source, group) pair that do not include an MSP Option field 500 (that is, multicast packets that originated from a multicast source within the routing domain and therefore were not processed and forwarded by an MSP Router within the same routing domain). In this case, the Interior Router first determines whether the (source, group) pair is under MSP control, specifically by searching for an Index Entry 1100 for the (source, group) pair. Assuming the (source, group) pair is under MSP control, then the Interior Router determines a relative priority for the intradomain multicast source and compares the relative priority for the intradomain multicast source to the relative priority of the Designated MSP Router in order to determine whether or not to forward the multicast packet. If the intradomain multicast source has a higher relative priority, then the Interior Router forwards the multicast packet. Otherwise, the Interior Router drops the multicast packet.

Figure 13:
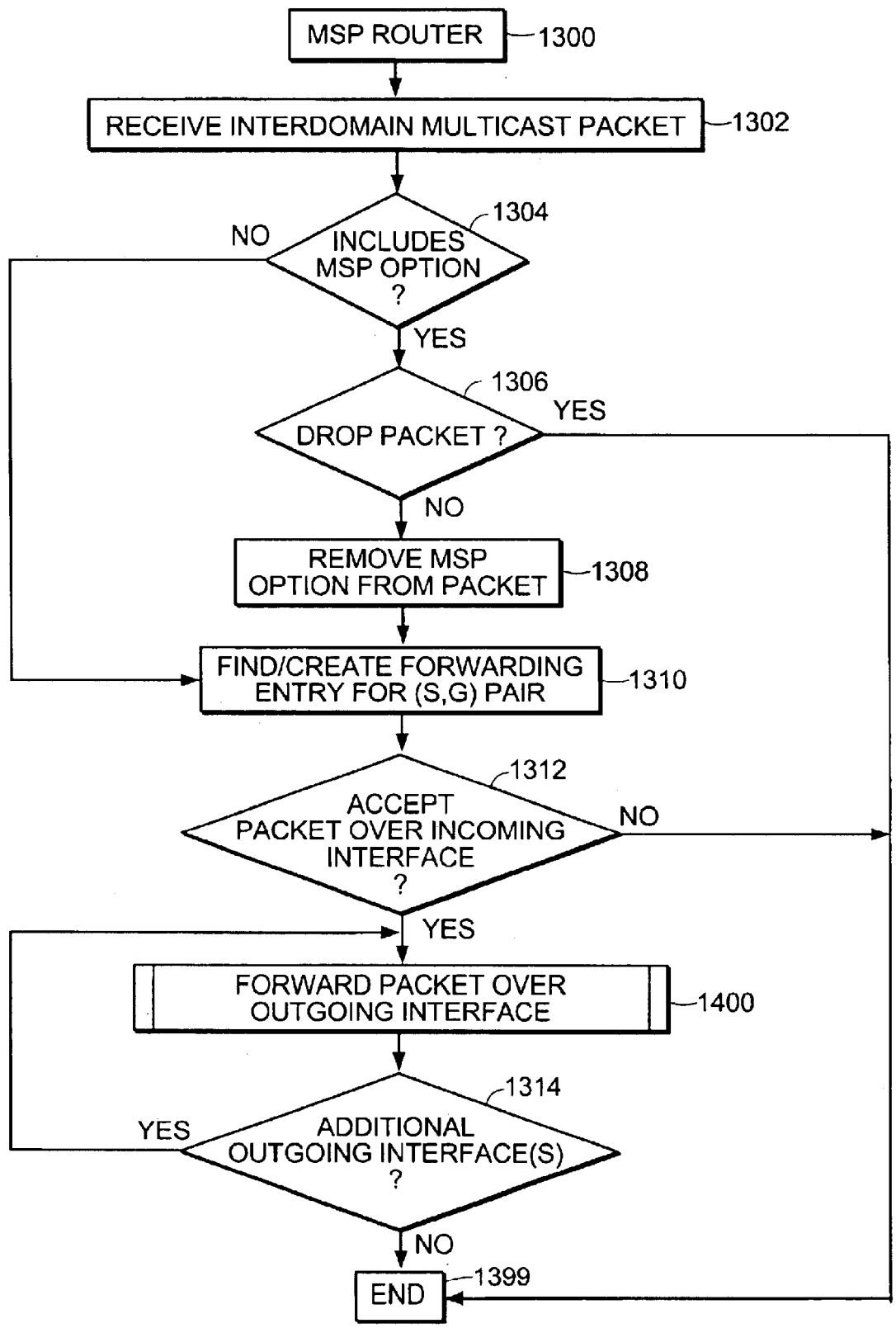
FIG. 13 is a logic flow diagram showing exemplary Multicast Source Proxy Router logic for processing an interdomain multicast packet in accordance with an embodiment of the present invention.

FIG. 13 is a logic flow diagram showing exemplary MSP Router logic for processing an interdomain multicast packet. Beginning at step 1300, and upon receiving the interdomain multicast packet in step 1302, the logic proceeds to determine whether the multicast packet includes an MSP Option field 500, in step 1304. If the multicast packet does not include an MSP Option field 500 (NO in step 1304), then the logic proceeds to step 1310. If the multicast packet does include an MSP Option field 500 (YES in step 1304), then the logic may drop the multicast packet or remove the MSP Option field 500 and proceed as if the multicast packet was received without an MSP Option field 500. Therefore, in step 1306, the logic determines whether the multicast packet should be dropped. If the logic determines that the multicast packet should be dropped (YES in step 1306), then the logic terminates in step 1399. If the logic determines that the multicast packet should not be dropped (NO in step 1306), then the logic removes the MSP Option field 500 from the multicast packet, in step 1306, and proceeds to step 1310.

In step 1310, the logic searches the forwarding table to find a forwarding entry 210 for the (source, group) pair. If there is no forwarding entry 210 for the (source, group) pair in the forwarding table, then the logic runs the multicast protocol on the (source, group) pair in order to determine the incoming and outgoing interfaces for the (source, group) pair, and creates a forwarding entry 210 for the (source, group) pair in the forwarding table. Based upon the information in the forwarding entry 210, the logic determines whether the multicast packet should be accepted over the incoming interface, in step 1312. If the logic determines that the multicast packet should not be accepted over the incoming interface (NO in step 1312), then the logic terminates in step 1399. If the logic determines that the multicast packet should be accepted over the incoming interface (YES in step 1312), then the logic forwards the multicast packet over each outgoing interface. Specifically, the logic forwards the multicast packet over an outgoing interface, in step 1400 (described in detail with reference to FIG. 14 below), and repeats the forwarding logic of step 1400 for each additional outgoing interface (YES in step 1314). After forwarding the multicast packet over each outgoing interface (NO in step 1314), the logic terminates in step 1399.

Figure 14:
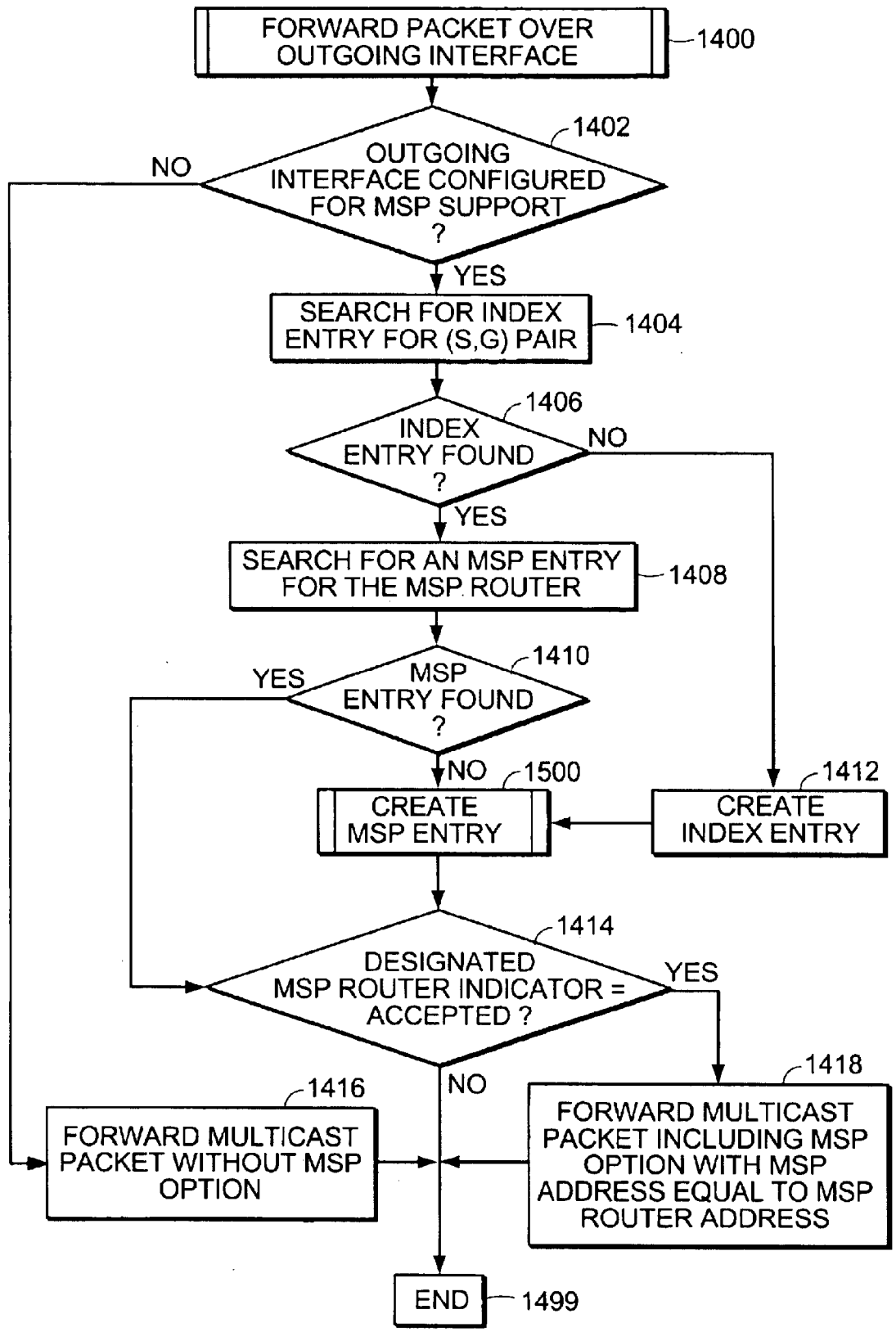
FIG. 14 is a logic flow diagram showing exemplary forwarding logic in accordance with an embodiment of the present invention.

FIG. 14 is a logic flow diagram showing exemplary forwarding logic 1400. Beginning at step 1400, the logic first determines whether the outgoing interface is configured for MSP support, in step 1402. If the outgoing interface is not configured for MSP support (NO in step 1402), then the logic forwards the multicast packet over the outgoing interface without an MSP Option field 500, in step 1416, and terminates in step 1499. If the outgoing interface is configured for MSP support (YES in step 1402), then the logic searches for an Index Entry 1100 for the (source, group) pair, in step 1404. If the logic does not find an Index Entry 1100 for the (source, group) pair (NO in step 1406), then the logic creates an Index Entry 1100 for the (source, group) pair, in step 1412, creates an MSP Entry 1200 for the MSP Router, in step 1500, and proceeds to step 1414. If the logic finds an Index Entry 1100 for the (source, group) pair (YES in step 1406), then the logic searches the MSP List for an MSP Entry 1200 for the MSP Router, in step 1408. If the logic finds an MSP Entry 1200 for the MSP Router (YES in step 1410), then the logic proceeds to step 1414. If the logic does not find an MSP Entry 1200 for the MSP Router (NO in step 1410), then the logic creates an MSP Entry 1200 for the MSP Router, in step 1500, and proceeds to step 1414.

Figure 15:
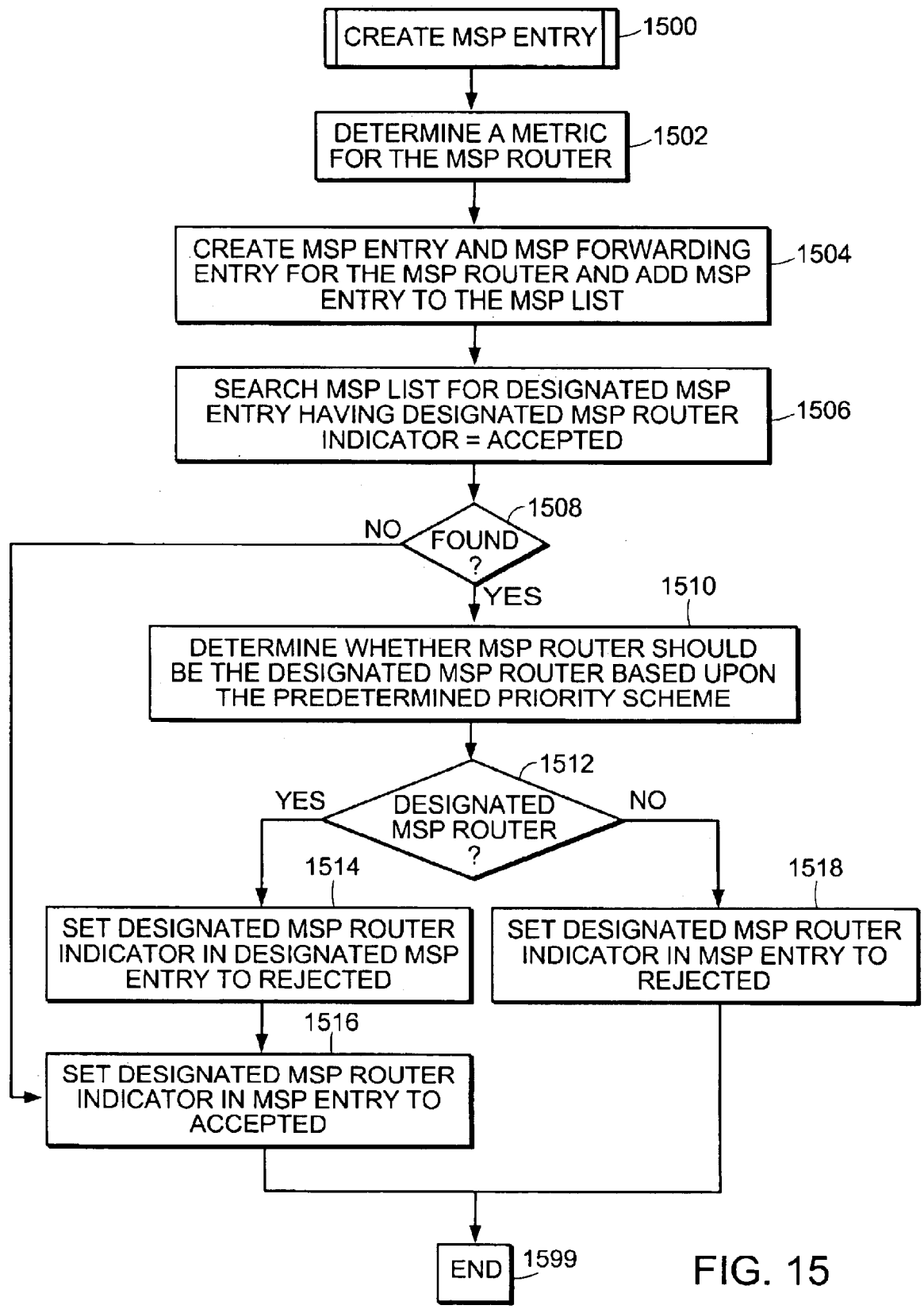
FIG. 15 is a logic flow diagram showing exemplary logic for creating an MSP Entry in accordance with an embodiment of the present invention.

FIG. 15 is a logic flow diagram showing exemplary logic for creating an MSP Entry 1200 for the MSP Router. Beginning at step 1500, the logic first determines a metric for the MSP Router, in step 1502. The logic then creates an MSP Entry 1200 and a corresponding MSP forwarding entry 210 for the MSP Router and adds the MSP Entry 1200 to the MSP List, in step 1504. The logic then searches the MSP List for a Designated MSP Entry having the Designated MSP Router Indicator field 1206 equal to ACCEPTED, in step 1506. If the logic does not find the Designated MSP Entry (NO in step 1508), then the logic sets the Designated MSP Router Indicator field 1206 in the MSP Entry 1200 equal to ACCEPTED, in step 1516, and terminates in step 1599. If the logic does find the Designated MSP Entry (YES in step 1508), then the logic proceeds to determine whether the MSP Router should be the Designated MSP Router for the (source, group) pair based upon the predetermined priority scheme, in step 1510, specifically by comparing the MSP Router's metric preference, metric value, and IP address to the metric preference, metric value, and IP address associated with the Designated MSP Entry. If the MSP Router should be the Designated MSP Router (YES in step 1512), then the logic sets the Designated MSP Router Indicator field 1206 in the Designated MSP Entry to REJECTED, in step 1514, sets the Designated MSP Router Indicator field 1206 in the MSP Entry 1200 to ACCEPTED, in step 1516, and terminates in step 1599. If the MSP Router should not be the Designated MSP Router (NO in step 1512), then the logic sets the Designated MSP Router Indicator field 1206 in the MSP Entry 1200 to REJECTED, in step 1518, and terminates in step 1599.

Once the MSP Entry 1200 has been found (in step 1410) or created (in step 1500), the logic proceeds from step 1414. In step 1414, the logic determines whether the MSP Router is the Designated MSP Router, specifically by determining whether the Designated MSP Router Indicator field 1206 in the MSP Entry 1200 is equal to ACCEPTED. If the MSP Router is the Designated MSP Router (YES in step 1414), then the logic forwards the multicast packet over the outgoing interface including an MSP Option field 500 with the MSP Address field 520 equal to the address of the MSP Router, in step 1418, and terminates in step 1499. If the MSP Router is not the Designated MSP Router (NO in step 1414), then the logic terminates in step 1499 without forwarding the multicast packet over the outgoing interface.

Figure 16:
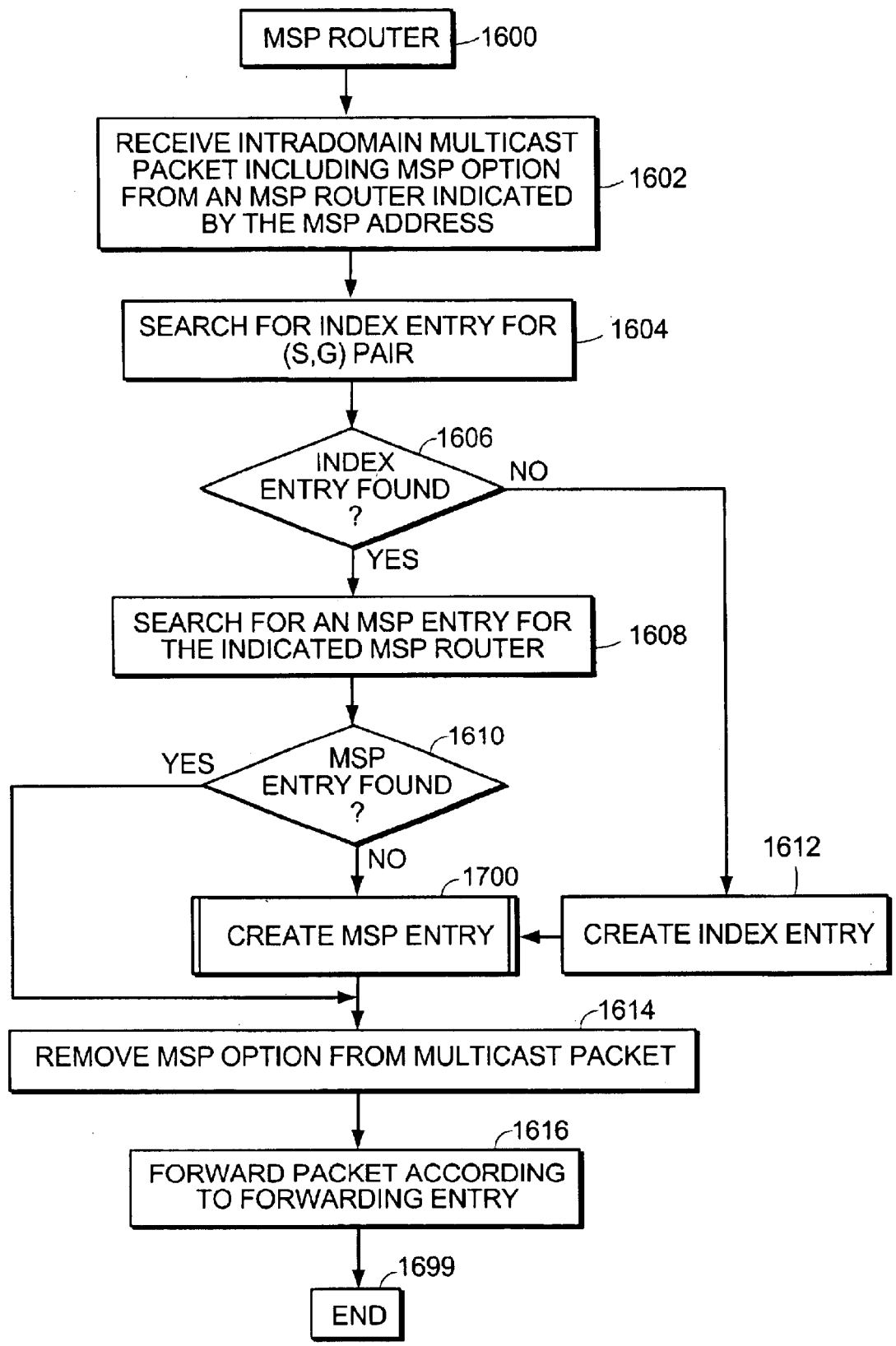
FIG. 16 is a logic flow diagram showing exemplary Multicast Source Proxy Router logic for processing an intradomain multicast packet in accordance with an embodiment of the present invention.

FIG. 16 is a logic flow diagram showing exemplary MSP Router logic for processing an intradomain multicast packet including an MSP Option field 500 from another MSP Router indicated by the MSP Address field 520. Beginning at step 1600, and upon receiving the intradomain multicast packet including the MSP Option field 500 from another MSP Router indicated by the MSP Address field 520 in step 1602, the logic first searches for an Index Entry 1100 for the (source, group) pair, in step 1604. If the logic does not find an Index Entry 1100 for the (source, group) pair (NO in step 1606), then the logic creates an Index Entry 1100 for the (source, group) pair, in step 1612, creates an MSP Entry 1200 for the MSP Router, in step 1700, and proceeds to step 1614. If the logic finds an Index Entry 1100 for the (source, group) pair (YES in step 1606), then the logic searches the MSP List for an MSP Entry 1200 for the indicated MSP Router, in step 1608. If the logic finds an MSP Entry 1200 for the indicated MSP Router (YES in step 1610), then the logic proceeds to step 1614. If the logic does not find an MSP Entry 1200 for the indicated MSP Router (NO in step 1610), then the logic creates an MSP Entry 1200 for the indicated MSP Router, in step 1700, and proceeds to step 1614.

Figure 17:
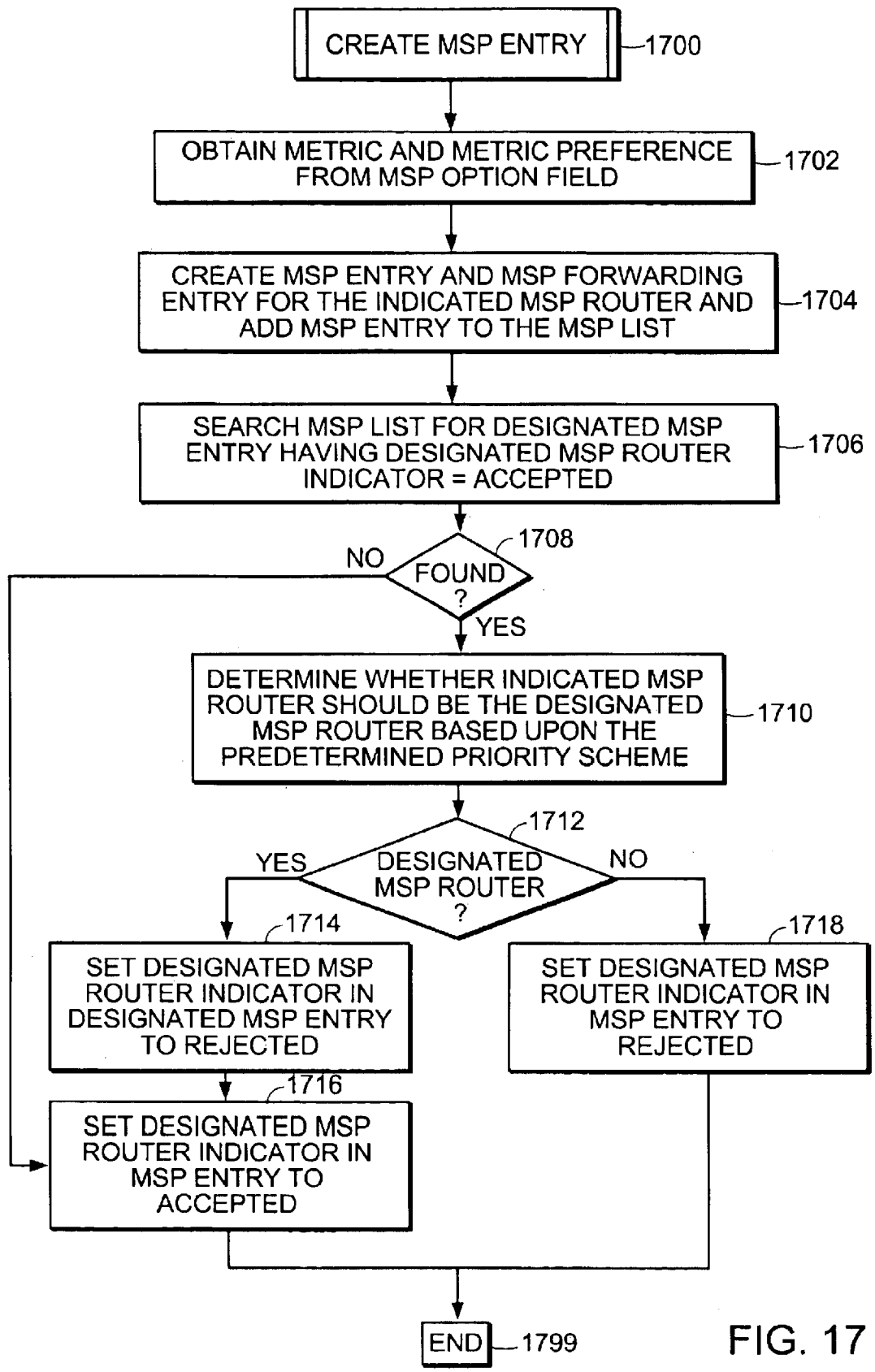
FIG. 17 is a logic flow diagram showing exemplary logic for creating an MSP Entry in accordance with an embodiment of the present invention.

FIG. 17 is a logic flow diagram showing exemplary logic for creating an MSP Entry 1200 for the MSP Router indicated by the MSP Address field 520 in the MSP Option field 500. Beginning at step 1700, the logic first obtains a metric and a metric preference for the indicated MSP Router from the MSP Option field 500, in step 1702. The logic then creates an MSP Entry 1200 and a corresponding MSP forwarding entry 210 for the indicated MSP Router and adds the MSP Entry 1200 to the MSP List, in step 1704. The logic then searches the MSP List for a Designated MSP Entry having the Designated MSP Router Indicator field 1206 equal to ACCEPTED, in step 1706. If the logic does not find the Designated MSP Entry (NO in step 1708), then the logic sets the Designated MSP Router Indicator field 1206 in the MSP Entry 1200 equal to ACCEPTED, in step 1716, and terminates in step 1799. If the logic does find the Designated MSP Entry (YES in step 1708), then the logic proceeds to determine whether the MSP Router should be the Designated MSP Router for the (source, group) pair based upon the predetermined priority scheme, in step 1710, specifically by comparing the indicated MSP Router's metric preference, metric value, and IP address to the metric preference, metric value, and IP address associated with the Designated MSP Entry. If the MSP Router should be the Designated MSP Router (YES in step 1712), then the logic sets the Designated MSP Router Indicator field 1206 in the Designated MSP Entry to REJECTED, in step 1714, sets the Designated MSP Router Indicator field 1206 in the MSP Entry 1200 to ACCEPTED, in step 1716, and terminates in step 1799. If the MSP Router should not be the Designated MSP Router (NO in step 1712), then the logic sets the Designated MSP Router Indicator field 1206 in the MSP Entry 1200 to REJECTED, in step 1718, and terminates in step 1799.

Once the MSP Entry 1200 has been found (in step 1610) or created (in step 1700), the logic proceeds from step 1614. In step 1614, the logic removes the MSP Option field 500 from the multicast packet. The logic then forwards the multicast packet according to the corresponding forwarding entry in the forwarding table, in step 1616. Specifically, the logic determines whether the multicast packet should be accepted over the incoming interface based upon the information in the forwarding entry 210. If the logic determines that the multicast packet should not be accepted over the incoming interface, then the logic terminates without forwarding the packet over any outgoing interface. If the logic determines that the multicast packet should be accepted over the incoming interface, then the logic forwards the multicast packet over each outgoing interface according to the logic 1400 shown and described with reference to FIG. 14 above. After forwarding the multicast packet over each outgoing interface, the logic terminates.

Figure 18:
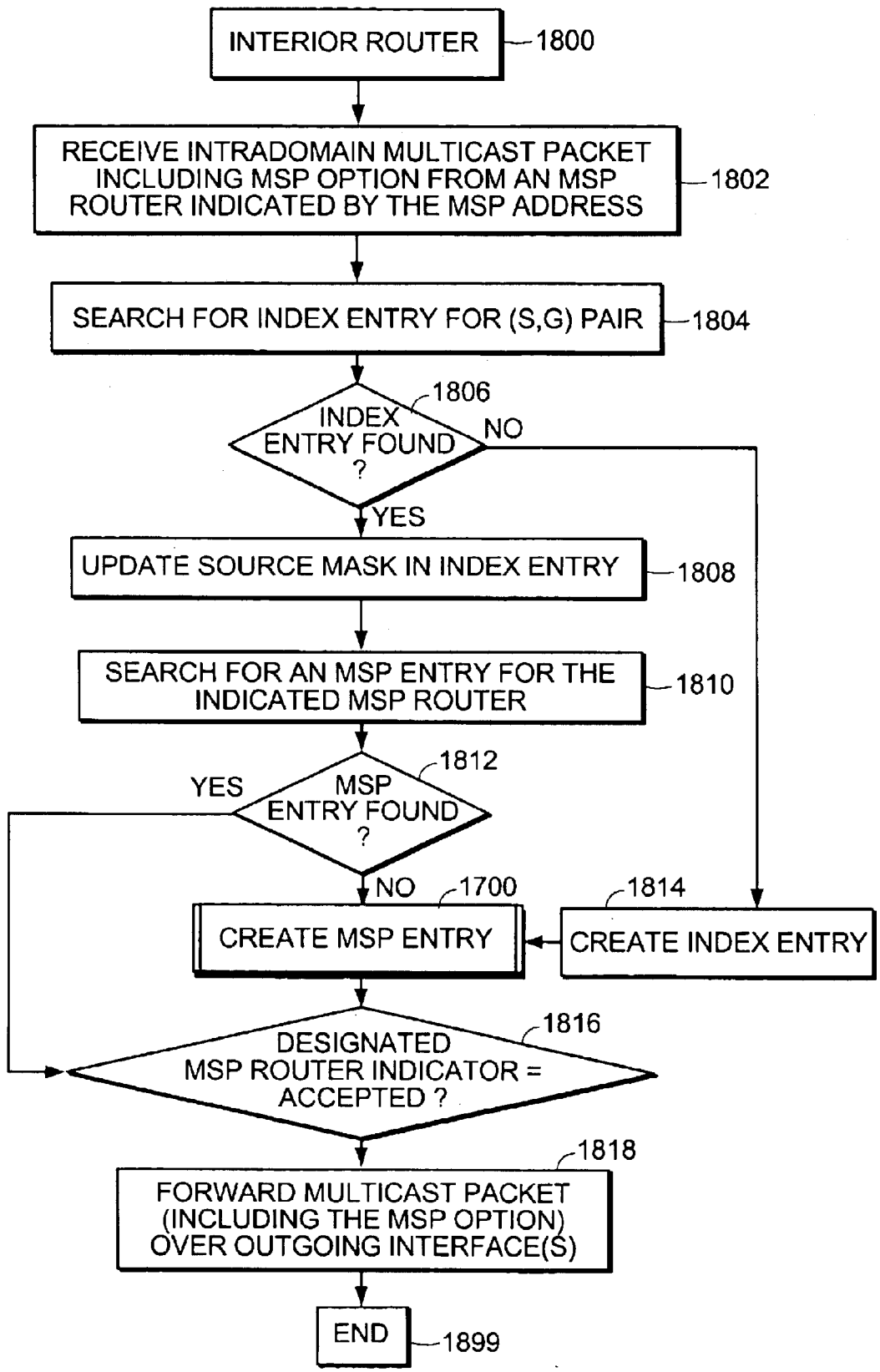
FIG. 18 is a logic flow diagram showing exemplary Interior Router logic for processing an intradomain multicast packet in accordance with an embodiment of the present invention.

FIG. 18 is a logic flow diagram showing exemplary Interior Router logic for processing an intradomain multicast packet including an MSP Option field 500 from an MSP Router indicated by the MSP Address field 520. Beginning at step 1800, and upon receiving the intradomain multicast packet including the MSP Option field 500 from the MSP Router indicated by the MSP Address field 520 in step 1802, the logic first searches for an Index Entry 1100 for the (source, group) pair, in step 1804. If the logic does not find an Index Entry 1100 for the (source, group) pair (NO in step 1806), then the logic creates an Index Entry 1100 for the (source, group) pair, in step 1814, creates an MSP Entry 1200 for the indicated MSP Router, in step 1700, and proceeds to step 1816. If the logic finds an Index Entry 1100 for the (source, group) pair (YES in step 1806), then the logic proceeds to update the Source Mask field 1104 in the Index Entry 1100 based upon the Source Mask field 518 in the MSP Option field 500. Specifically, if the Source Mask field 518 is more specific (i.e., greater) than the Source Mask field 1104, then the logic sets the Source Mask field 1104 equal to the Source Mask field 518.

After updating the source mask, in step 1808, the logic searches the MSP List for an MSP Entry 1200 for the indicated MSP Router, in step 1810. If the logic finds an MSP Entry 1200 for the indicated MSP Router (YES in step 1812), then the logic proceeds to step 1816. If the logic does not find an MSP Entry 1200 for the indicated MSP Router (NO in step 1812), then the logic creates an MSP Entry 1200 for the indicated MSP Router, in step 1700, and proceeds to step 1816.

In step 1816, the logic determines whether the indicated MSP Router is the Designated MSP Router, specifically by determining whether the Designated MSP Router Indicator field 1206 in the MSP Entry 1200 is equal to ACCEPTED. If the indicated MSP Router is the Designated MSP Router (YES in step 1816), then the logic forwards the multicast packet over the outgoing interface(s) including the MSP Option field 500, in step 1818, and terminates in step 1899. If the indicated MSP Router is not the Designated MSP Router (NO in step 1816), then the logic terminates in step 1899 without forwarding the multicast packet over the outgoing interface(s).

As discussed above, after an MSP Router elects a Designated MSP Router, it is possible for the Designated MSP Router to fail. When the Designated MSP Router fails, it is necessary for all routers in the routing domain to elect a new Designated MSP Router from among the other MSP Routers in the routing domain. Therefore, in a preferred embodiment of the present invention, each MSP Router that detects the failure of the Designated MSP Router forwards multicast packets for the (source, group) pair including an MSP Option field with the D field 516 set to one (1) in order to inform the other routers in the routing domain that the Designated MSP Router has failed. Each router in the routing domain that receives a multicast packet including an MSP Option field with the D field 516 set to one (1) removes the Designated MSP Router from its list of MSP Routers, and then elects a new Designated MSP Router from among the remaining MSP Routers in the list of MSP Routers. Of course, there may be a transitional period during which multiple MSP Routers forward multicast packets for the (source, group) pair including an MSP Option field with the D bit 516 set to one (1). Therefore, in order to prevent each router from deleting the new Designated MSP Router and electing yet another Designated MSP Router for each such multicast packet, each router preferably starts a predetermined "blind timer" upon receiving a first multicast packet including an MSP Option field with the D field 516 set to one (1), and ignores the D bit 516 in subsequent multicast packets for the duration of the blind timer.

Figure 19:
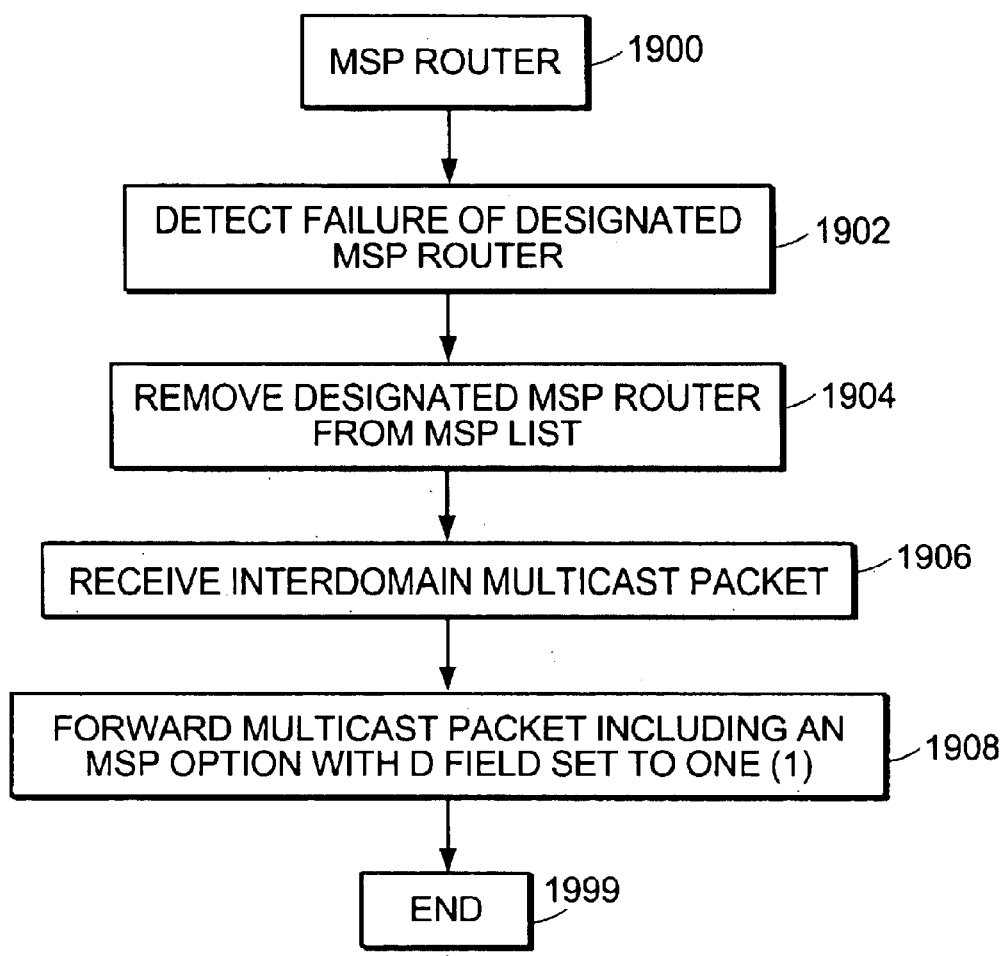
FIG. 19 is a logic flow diagram showing exemplary Multicast Source Proxy Router logic for forwarding a multicast packet following a failure of the Designated MSP Router in accordance with an embodiment of the present invention.

FIG. 19 is a logic flow diagram showing exemplary MSP Router logic for forwarding a multicast packet following a failure of the Designated MSP Router. Beginning at step 1900, and upon detecting a failure of the Designated MSP Router in step 1902, the logic proceeds to remove the Designated MSP Router from the list of MSP Routers, in step 1904. Then, upon receiving an interdomain multicast packet, in step 1906, the logic forwards the multicast packet including an MSP Option field 1500 with the MSP Address field 520 equal to the MSP Router address and the D field 516 set to one (1). The logic terminates in step 1999.

Figure 20:
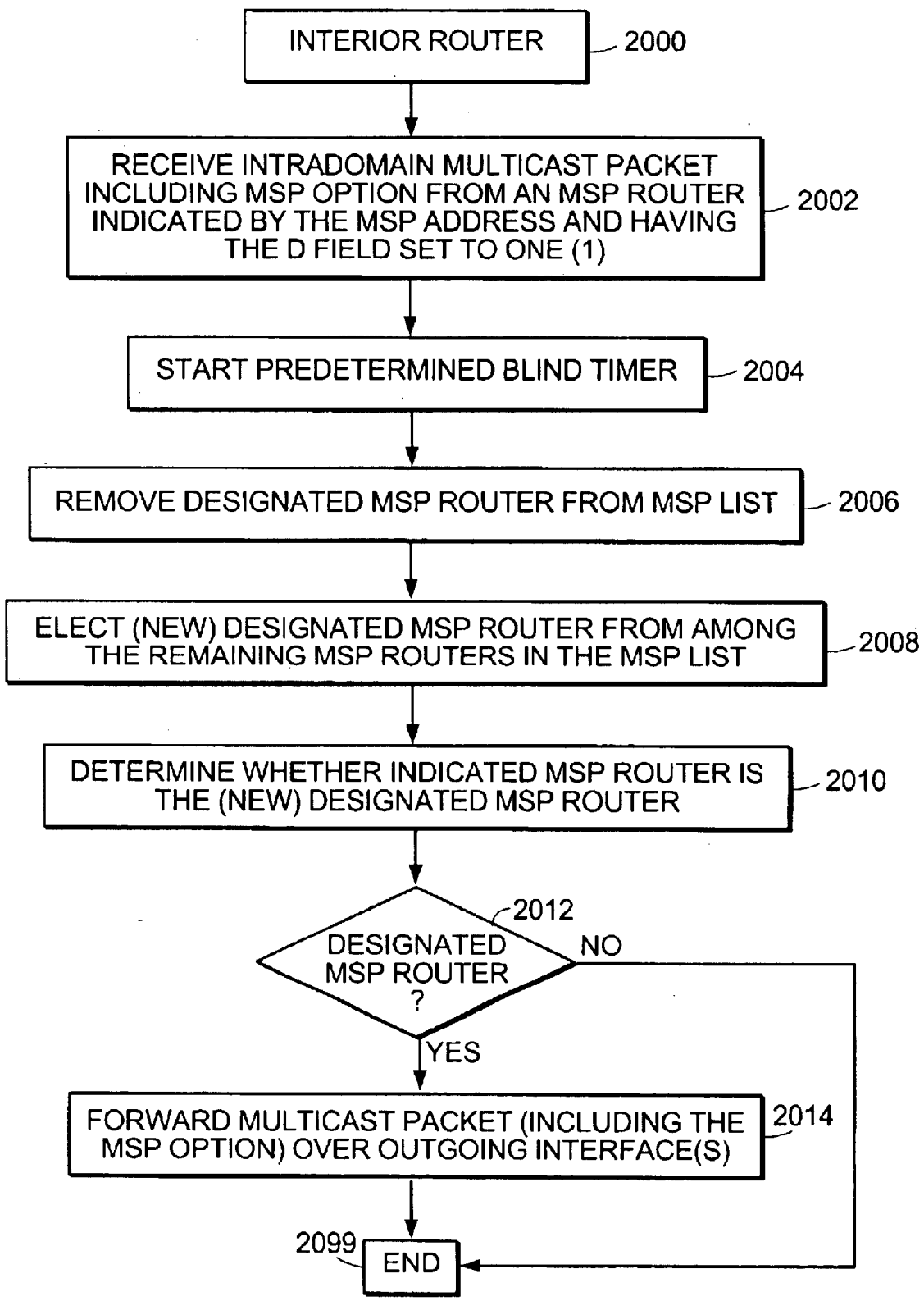
FIG. 20 is a logic flow diagram showing exemplary Interior Router logic for electing a new Designated MSP Router following a failure of the Designated MSP Router in accordance with an embodiment of the present invention.

FIG. 20 is a logic flow diagram showing exemplary Interior Router logic for electing a new Designated MSP Router following a failure of the Designated MSP Router. Beginning at step 2000, and upon receiving an intradomain multicast packet including an MSP Option field 500 from an MSP Router indicated by the MSP Address field 520 with the D field 516 set to one (1) in step 2002, the logic proceeds to start a predetermined blind timer, in step 2004. The logic then removes the Designated MSP Router from the list of MSP Routers, in step 2006, and proceeds to elect a new Designated MSP Router from among the remaining MSP Routers in the list of MSP Routers, in step 2008. After electing a new Designated MSP Router, the logic determines whether the indicated MSP Router is the newly elected Designated MSP Router, in step 2010. If the indicated MSP Router is the Designated MSP Router (YES in step 2012), then the logic forwards the multicast packet (including the MSP Option) over the outgoing interface(s), in step 2014, and terminates in step 2099. If the indicated MSP Router is not the Designated MSP Router (NO in step 2012), then the logic terminates in step 2099 without forwarding the multicast packet over the outgoing interface(s).

II. Substantive Text of Proposed IETF Submission

Abstract

This memo introduces an IP multicast source proxy option in anticipation to improve the scalability of dense-mode protocols. In case of many-to-many multicast applications, this option will enable downstream routers to aggregate (S,G) states consistently. This option will also allow to dynamically re-root subset of multicast distribution tree as required.

1. Introduction

Dense-mode multicast protocols, such as MOSPF ([2]), DVMRP ([3]) and PIM-DM ([1]), have (S,G) states installed in the routers. However, most of multicast domains are stub domains, with only one ingress/egress border router. As a result, all multicast traffic from outside the stub domain will go through the ingress/egress border router, while all routers inside the domain still unnecessarily install a (S,G) state for each source. These (S,G) states in fact can be replaced by a single (B,G) state where B is the ingress/egress border router.

The negative aspect of installing (S,G) state for each source is that we unnecessarily increase the size of multicast forwarding table, and waste the efforts of multicast protocols in maintaining these states. For example, for each (S,G), MOSPF has to do a separate Dijikstra calculation, and DVMRP and PIM-DM have to do periodical graft/prune. Although currently the domainating multicast applications are one-to-many, in future, many-to-many applications will essentially be in use at large over the Internet.

On the other hand, dense mode multicast protocols require all routers on the forwarding path to join a globally-consistent tree. This is to prevent multicast routing loop. However, in many cases, as required for multicast policy, multicast security and multicast applications, self-contained routing domains need to re-root their domain-specific subset tree. This re-rooting is not supported by multicast protocols. As a result, as specified in BGMP ([4]), a multicast data has to be transmitted across a domain from one border router to another, and then be forwarded back into the domain (the reason is this other border router is the "correct" upstream for some routers in the domain).

This memo proposes a Multicast Source Proxy (MSP) option to the IP header. An MSP Router, typically a domain border router, functions on behalf of multicast source networks from beyond a domain. On receipt of a multicast packet, the router determines if there are multiple sources for the same group. If so, when forwarding the packet to an intra-domain outgoing interface, the MSP Router inserts an MSP option to the packet and forwards it downstream along the tree rooted from the MSP Router itself. Downstream routers will join the MSP Router-rooted tree by running multicast protocol on the forwarding entry (MSP Router, group) instead of (source, group). The MSP option provides source mask and thus downstream routers can install a (source/mask, group) entry in the forwarding table where its forwarding decision maps to the (MSP Router, group) entry. All subsequent data will be forwarded in accordance with the (MSP Router, group) forwarding entry.

In the case of multiple MSP Routers, all routers consistently elect a designated MSP Router with the lowest preference, the shortest metric and the lowest IP address preferred. The election process relies on the live multicast data. Each MSP Router has neighborship with the designated MSP Router, which is refreshed by the live data. The MSP option provides a D-bit to synchronize the re-election process in case of network change.

The use of Multicast Source Proxy option, in case of many-to-many multicast sessions, will substantially reduces the number of (S,G) states, avoids excessive Dijikstra calculation in MOSPF routers, and saves significant number of DVMRP and PIM-DM graft/prune message pairs. This option will allow to rebuild a domain specific tree rooted from a router or host as required.

2. Format of Multicast Source Proxy Option

Multicast Source Proxy (MSP) option is an IP option to be added after the IP header. This option is added on-demand when there is a need to aggregate multiple sources for the same group, or when a subset of global multicast forwarding tree need to be re-rooted.

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 1 | 0 | | Type | | | | | | | | Length | | | | | M | D | | Reserved | | | | | | Source Mask | | | | | | |
| Multicast Source Proxy (MSP) Address | | | | | | | | | | | | | | | | | | | | | | | | | | | | | | | |
| Metric Preference (if present) | | | | | | | | | | | | | | | | | | | | | | | | | | | | | | | |
| Metric (if present) | | | | | | | | | | | | | | | | | | | | | | | | | | | | | | | |

Type To be defined.

Length The length, in octets, of the option excluding the first two bytes for the type and length fields.

M Metric. If this bit set, both the metric preference and the metric fields are present. It implies there are multiple MSP Routers for the same subset of a multicast distribution tree and the designated MSP Router should be elected among these MSP Routers.

D Designated. If this bit set, it means the current designated MSP Router concerning the (source/mask, group) pair failed and a new designated MSP Router should be re-elected.

Reserved Must be zero.

Source Mask

The number of leading bits that define the source network or the aggregation of a set of source networks. It applies to the source address field in the IP header.

Multicast Source Proxy (MSP) Address

Address of a router on a critical path of a multicast distribution tree. It is a new root for a subset of the multicast distribution tree. Typically this is the address of a border router. Within the context of multicast security, this may be the address of a key distributor.

Metric Preference

If present, this is a preference value that tells internal routers within the subset of forwarding tree which MSP router is preferred. The MSP Router with the lowest preference is preferred.

Metric If present, this is the metric to the source. In case of a tie between the preferences of two MSP Routers, the metric is used to determine which MSP Router is preferred. The MSP Router with the lowest metric is preferred.

3. Multicast Data Forwarding with MSP Option

3.1 Installing (MSP, G) State

When a router receives a multicast data with the MSP option, if there is not any forwarding state for the MSP address, it should consult relevant multicast protocol to install (MSP,G) state. This means DVMRP/PIM-DM will trigger Prune/Graft for (MSP,G) state as required, and MOSPF will perform SPF calculation for (MSP,G).

3.2 Installing (S/mask, G) State

When a router receives a multicast data with the MSP option, it also installs in the forwarding table a (S/mask, G) state where the mask is derived from the MSP option. However, for this state, there is no need to consult the relevant multicast protocol to determine the forwarding property.

Instead, the (S/mask,G) entry has a MSP list. The MSP list has a list of MSP entries, with the designated MSP entry preferred. Each MSP entry points to the relevant (MSP,G) forwarding state. The forwarding decision for this (S/mask, G) state is determined by the (MSP,G) state for the designated MSP Router.

3.3 Forwarding Data With MSP Option

When receiving a multicast data with an MSP option, the router searches the forwarding table for the (S,G) in concern. If there is no matching state, the router installs a (MSP,G) state and (S/mask, G) state as above, and then forwards the data in accord with the the (MSP,G) state for the designated MSP Router.

Else, a matching state is found. In this case, if the MSP list is empty, it means previously this data stream was forwarded without MSP intervention. In this case, the matching state should be flushed. The data then is processed as in the above case where no matching state is found.

Else, if the designated MSP address is the one in the MSP option, the data is forwarded in accordance with the relevant (MSP,G) state.

Else, if the MSP address in the MSP option appears in the MSP list, the data is dropped.

Else, the MSP address does not appear in the MSP list. In this case, a new MSP entry is added to the MSP list, and the corresponding (MSP,G) state is created if there is not. The designated MSP Router is re-elected based on the preference values and metric costs. As a result, if the MSP address in the MSP option is not the designated one, the data is dropped. Otherwise, the data is forwarded in accordance with the (MSP,G) state for the designated MSP Router.

3.4 Forwarding Data Without MSP Option

When receiving a multicast data with an MSP option, the router searches the forwarding table for the (S,G) in concern. If there is no matching state, or if there is a matching forwarding state while the MSP list is empty, the data will be forwarded without MSP intervention.

Otherwise, there is a matching (S/mask,G) state while the MSP list is not empty. In this case, the router should compare the metric to the source with the one to the designated MSP Router. If the metric to the source is better, the router should run the underlying multicast protocol on (S,G), install a forwarding entry (S,G), and forward the packet accordingly. If the metric to the MSP Router is better, however, the packet should be dropped.

4. Various Considerations

4.1 Initiation of Designated MSP Router Election

Each MSP Router should initiate the election of Designated MSP Router. Other MSP Routers, when receiving multicast data with the MSP option, should participate in the election. If, however, an MSP router does not intend to behave as a designated MSP Router, it can increase its preference value and metric in the MSP option.

4.2 Block MSP Option

A MSP Router should block MSP option from flowing beyond the domain. When it receives from the domain a multicast packet with an MSP option, the MSP Router should remove the MSP option and forward the packet in accordance with the native forwarding entry (S,G). On the other hand, when the MSP Router receives from outside the domain a packet with an MSP option, it should either discard the packet or replace the MSP option with a new MSP option, and then forward the packet in accordance with the forwarding entry (S,G).

4.3 Re-election of Designated MSP Router

The designated MSP Router re-election process should not be triggered unless the designated MSP Router fails. An MSP Router, when there is a change in its routing table, should not trigger the re-election of the designated MSP Router. However, a newly emerging MSP Router may forward multicast data with the MSP option inserted and thus all routers have to re-elect the designated MSP Router.

4.4 Failure of Designated MSP Router

Each MSP Router should maintain its neighborship with the Designated MSP Router for all (source/mask, group) states. The MSP Router may refresh the neighborship by receiving multicast data with the MSP option inserted by the designated MSP Router. When the MSP Router determines the designated MSP Router fails, it should resume forwarding subsequent multicast data with MSP option inserted. In this case, the D-bit should be set, which is intended for electing a new designated MSP Router among all live MSP Routers. All downstream routers, when receiving such a MSP option, should remove the designated MSP entry and the relevant forwarding entry, re-elect the designated MSP Router, and only forward multicast data from the new designated MSP Router. There may be a transitional period in which multiple MSP Routers all set the D-bit. To prevent downstream routers from removing the subsequent new designated MSP entry, each downstream router should start a timer when seeing the D-bit set. In the lifetime of this timer, the routers should disregard the D-bit. The expiry of the timer will trigger the D-bit to be validated again.

Reference

[1] S. Deering et al. "Protocol Independent Multicast Version 2 Dense Mode Specification".<draft-ietf-pim-v2-dm-02.txt>, PIM Working Group, March 1999.

[2] J. Moy. "Multicast Extensions to OSPF." RFC 1584, March 1994.

[3] T. Pusateri. "Distance Vector Multicast Routing Protocol". <draft-ietf-idmr-dvmrp-v3-08.txt>, Inter-Domain Multicast Routing Working Group, February 1999.

[4] D. Thaler, D. Estrin and D. Meyer. "Border Gateway Multicast Protocol (BGMP): Protocol Specification." <draft-ietf-idmr-gum-03.txt>, August 1998.

III. HIERARCHICAL MULTICAST SECURITY APPLICATION

Figure 21:
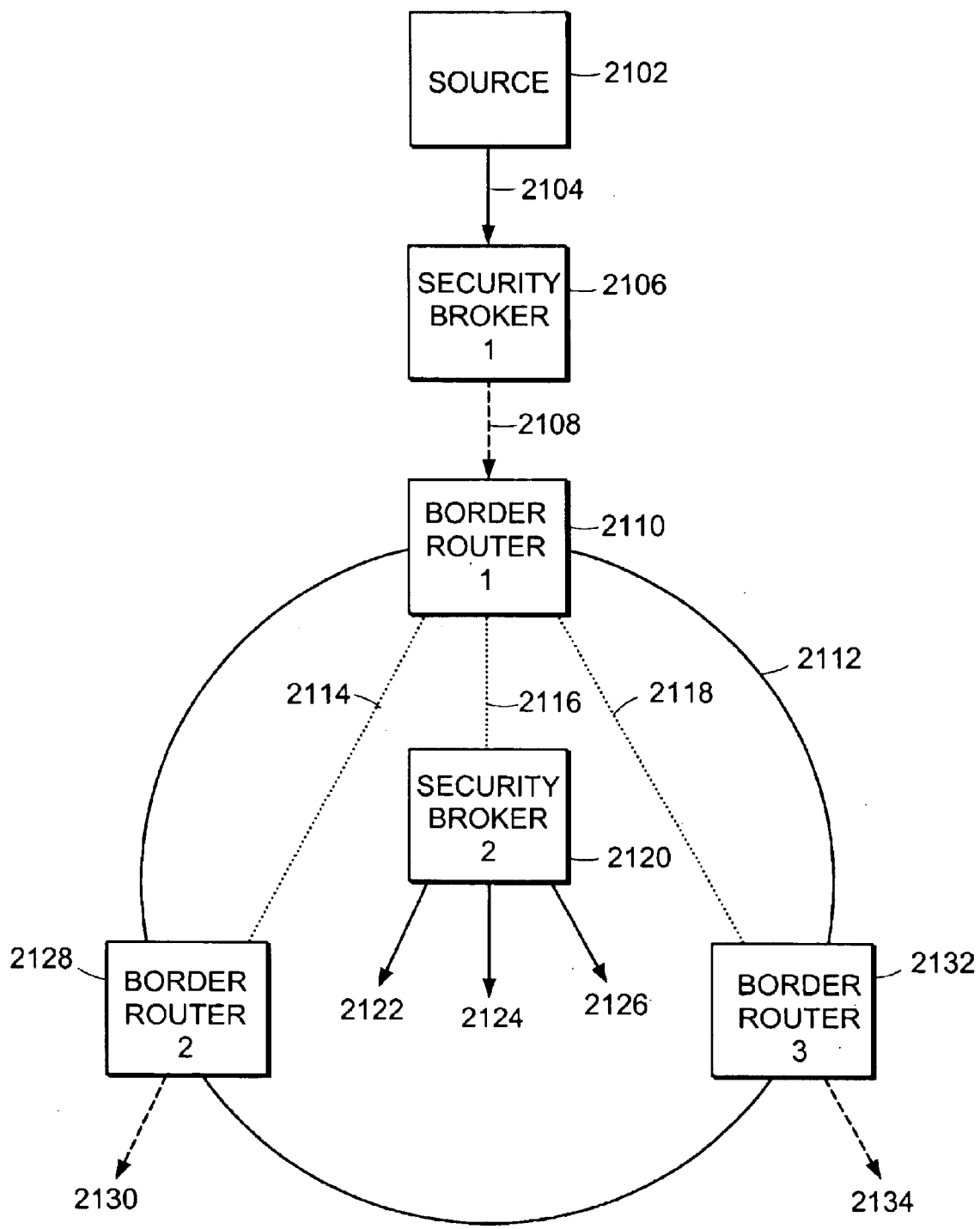
FIG. 21 is a block diagram showing an exemplary Heretical Multicast Security network in accordance with an embodiment of the present invention.

FIG. 21 shows an exemplary Heretical Multicast Security (HMS) network 2100. The Source 2102 sends unencrypted (native) multicast data 2104 to the Security Broker 2106. The Security Broker 2106 encrypts the native multicast data 2104, and sends the encrypted multicast data 2108 to the routing domain 2112 via the Border Router 2110. The Border Router 2110 uses encapsulation ("tunneling") to route the encrypted multicast data 2108 to various devices in the routing domain 2112. Specifically, the Border Router 2110 routes the encrypted multicast data 2108 to the Border Router 2128 via the "tunnel" 2114, to the Security Broker 2120 via the "tunnel" 2116, and to the Border Router 2132 via the "tunnel" 2118. The Border Routers 2128 and 2132 decapsulate the data (2114 and 2118, respectively) before forwarding the encrypted multicast data (2130 and 2134, respectively). The Security Broker 2120 decapsulates and decrypts the data 2116, and forwards unencrypted (native) multicast data (2122, 2124, 2126).

In such an HMS network, the multicast data deviates from the original multicast distribution tree (i.e., the multicast distribution tree rooted at the Border Router 2110 in FIG. 21) and flows along a zone-specific tree rooted at a security broker (i.e., the multicast distribution tree rooted at the Security Broker 2120 in FIG. 21). A router that is downstream from both the Border Router 2110 and the Security Broker 2120 maintains forwarding entries for both multicast distribution trees, although the router relies on the forwarding entry for the original multicast distribution tree (i e., the multicast distribution tree rooted at the Border Router 2110) and therefore drops multicast packets received from the Security Broker 2120.

In order to solve this problem, each Security Broker that performs decapsulation/decryption and native forwarding of the multicast data, such as the Security Broker 2120 in FIG. 21, inserts an MSP Option field 1500 into each native multicast packet. The MSP Option field 500 includes the MSP Address field 520 equal to the address of the Security Broker, and preferably has the M field 515 reset to zero (0) since there is no metric or metric preference for the Security Broker. Each downstream router that receives the multicast packets from the Security Broker including the MSP Option field 500 installs the appropriate Index Entry 1100, MSP Entry 1200, and MSP forwarding entry 210 as described above, and processes such multicast packets according to the MSP Option.

Figure 22:
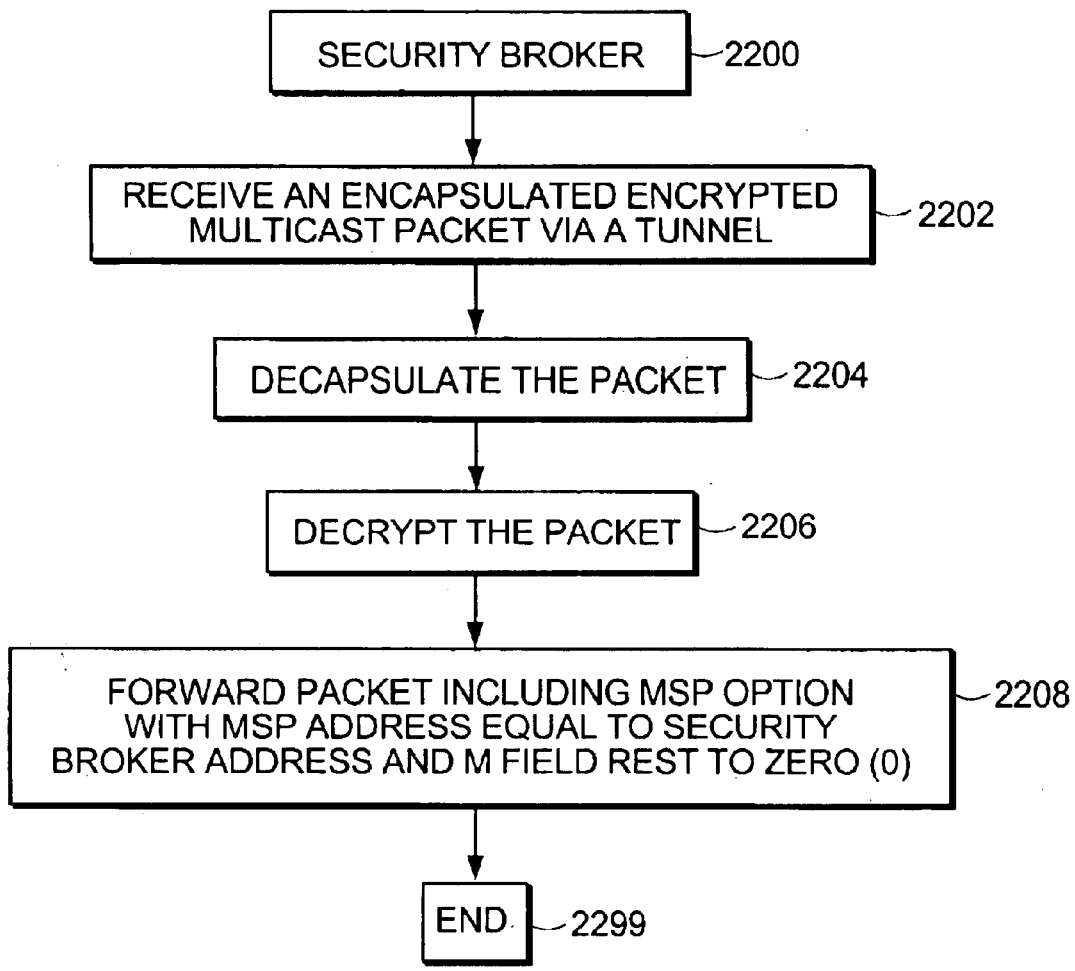
FIG. 22 is a logic flow diagram showing exemplary Security Broker logic for forwarding a multicast packet in accordance with an embodiment of the present invention.

FIG. 22 is a logic flow diagram showing exemplary Security Broker logic for forwarding a multicast packet. Beginning at step 2200, and upon receiving an encapsulated encrypted multicast packet via a tunnel in step 2202, the logic first decapsulates the packet in order to obtain the encrypted multicast packet, in step 2204. The logic then decrypts the packet in order to obtain the unencrypted (native) multicast packet, in step 2206, and forwards the packet including an MSP Option field 500 with the MSP Address field 520 equal to the address of the Security Broker and the M field 515 reset to zero (0), in step 2208. The logic terminates in step 2299.

IV. Alternative Embodiments

In a preferred embodiment of the present invention, predominantly all of the MSP Router logic (600, 700, 800, 1300, 1400, 1500, 1600, 1700, 1900) and Interior Router logic (900, 1000, 1800, 1700, 2000) is implemented as a set of computer program instructions that are stored in a computer readable medium and executed by an embedded microprocessor system within the MSP Router and Interior Router, respectively. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for reducing forwarding states in a network domain of a communication system having at least one forwarding device in communication with a number of interior devices, involving forwarding by the forwarding device a multicast packet including an option field identifying a forwarding device and forwarding the multicast packet by each interior device based upon at least the forwarding device identified in the option field of the multicast packet. Each interior device determines a designated forwarding device from among the at least one forwarding device in the network domain and forwards the multicast packet if the forwarding device identified in the option field of the multicast packet is the designated forwarding device.

The present invention may also be embodied as a method for reducing forwarding states in a network domain of a communication system, involving aggregating one or more (source, group) pairs to form an aggregate (source, group) pair that is rooted at the forwarding device in the network domain and joining the re-rooted subset of the multicast distribution tree for the (source, group) pair by the interior devices in the network domain. Each interior device runs a multicast protocol on the aggregate (source, group) pair and forwards multicast packets for the (source, group) pair based upon a forwarding entry for the aggregate (source, group) pair.

The present invention may also be embodied as a method, device, or computer program for reducing forwarding states by a device in a network domain of a communication system, in which the device receives a multicast packet, inserts an option field into the multicast packet including a device identifier identifying the device, and forwards the multicast packet including the option field.

The present invention may also be embodied as a method, device, or computer program for reducing forwarding states by an interior device in a network domain of a communication system, in which the interior device receives a multicast packet for the (source, group) pair, determines whether the (source, group) pair is under multicast source proxy control, and determines whether to accept the multicast packet based upon a designated multicast source proxy device for the (source, group) pair, if the (source, group) pair is under multicast source proxy control.

The present invention may also be embodied as a communication system having at least one forwarding device in communication with a number of interior devices, wherein the forwarding device forwards a multicast packet including an option field identifying the forwarding device, and wherein each interior device forwards the multicast packet based upon at least the forwarding device identified in the option field of the multicast packet. Each interior device determines a designated forwarding device from among the at least one forwarding device in the network domain and forwards the multicast packet if the forwarding device identified in the option field of the multicast packet is the designated forwarding device.

The present invention may also be embodied as a communication system having at least one forwarding device in communication with a number of interior devices, wherein one or more (source, group) pairs are aggregated to form an aggregate (source, group) pair that is rooted at a forwarding device in the network domain and each interior device joins the re-rooted subset of the multicast distribution tree for the (source, group) pair. The interior devices run a multicast protocol on the aggregate (source, group) pair and forward multicast packets for the (source, group) pair based upon a forwarding entry for the aggregate (source, group) pair.

The present invention may be embodied in other specific forms without departing from the essence or essential characteristics. The described embodiments are to be considered in all respects only as illustrative and not restrictive.

I claim:

1. A method for reducing forwarding states by a device in a network domain of a communication system, the method comprising:

receiving a multicast packet for a (source,group) pair;

determining whether the device is the designated multicast source proxy device for the (source, group) pair by maintaining a list of multicast source proxy devices for the (source, group) pair and determining the designated multicast source proxy device for the (source, group) pair from among the multicast source proxy devices in the list of multicast source proxy devices based upon a predetermined priority scheme;

wherein each multicast source proxy device in the list of multicast source proxy devices is associated with priority information indicating a relative priority for the multicast source proxy device to be the designated multicast source proxy device wherein the priority information comprises at least one of:

a predetermined metric indicating preference value a number of device hops from the multicast source proxy device to a multicast source for the (source, group) pair; and an Internet Protocol address for the multicast source proxy device.

2. The method of claim 1, comprising:

determining whether to accept the multicast packet, wherein the step of determining whether the device is a designated multicast source proxy device for the (source, group) pair, is performed once the multicast packet is accepted;

inserting an option field into the multicast packet, if the device is the designated multicast source proxy device for the (source, group) pair, the option field including a device identifier identifying the device; and forwarding the multicast packet including the option field, if the device is the designated multicast source proxy device for the (source, group) pair.

3. The method of claim 2, wherein the multicast packet is an interdomain multicast packet including an option field from another routing domain, and wherein determining whether to accept the multicast packet comprises:

accepting the multicast packet and removing the option field from the multicast packet.

4. The method of claim 2, wherein the multicast packet is an interdomain multicast packet including an option field from another routing domain, and wherein determining whether to accept the multicast packet comprises:

dropping the multicast packet.

5. The method of claim 2, further comprising:

determining that the designated multicast source proxy device for the (source, group) pair has failed;

inserting the option field into the multicast packet, the option field including the device identifier identifying the device and further including an indicator indicating that the designated multicast source proxy device has failed; and forwarding the multicast packet including the option field.

6. The method of claim 1, wherein maintaining the list of multicast source proxy devices for the (source, group) pair comprises:

maintaining an index entry for the (source, group) pair; and maintaining a multicast source proxy entry for each multicast source proxy device.

7. The method of claim 6, wherein maintaining the list of multicast source proxy devices for the (source, group) pair comprises:

creating a multicast source proxy entry for the device.

8. The method of claim 6, wherein the multicast packet includes an option field identifying another multicast source proxy device in the network domain, and wherein maintaining the list of multicast source proxy devices for the (source, group) pair comprises:

creating a multicast source proxy entry for the other multicast source proxy device based upon the option field in the multicast packet.

9. The method of claim 1, wherein the priority information, and wherein determining the designated multicast source proxy device for the (source, group) air from among the multicast source proxy devices in the list of multicast source proxy devices comprises electing as the designated multicast source proxy device the multicast source proxy device having the highest relative priority.

10. The method of claim 9, wherein determining the designated multicast source proxy device for the (source, group) pair from among the multicast source proxy devices in the list of multicast source proxy devices comprises:

electing as the designated multicast source proxy device the multicast source proxy device having the lowest metric preference value, if only one multicast source proxy device has the lowest metric preference value;

electing as the designated multicast source proxy device the multicast source proxy device having the lowest metric preference value and the lowest metric, if more than one multicast source proxy device has the lowest metric preference value and only one multicast source proxy device has the lowest metric; and selecting as the designated multicast source proxy device the multicast source proxy device having the lowest metric preference value, the lowest metric, and the lowest Internet Protocol address, if more than one multicast source proxy device has the lowest metric preference value and the lowest metric.

11. The method of claim 1, comprising:

receiving the multicast packet;

decapsulating the multicast packet;

decrypting the decapsulated multicast packet;

inserting the option field into the decrypted multicast packet; and forwarding the multicast packet including the option field.

12. A device for reducing forwarding states in a network domain of a communication system, the device comprising:

receiving logic operably coupled to receive a multicast packet for a (source, group) pair;

multicast source proxy logic operably coupled to determine whether to accept the multicast packet and to insert an option field into the multicast packet if the device is a designated multicast source proxy device for the (source, group) pair, wherein the multicast source proxy logic is operably coupled to maintain a list of multicast source proxy devices for the (source, group) pair and determine the designated multicast source proxy device for the (source, group) pair from among the multicast source proxy devices in the list of multicast source proxy devices based upon a predetermined priority scheme, wherein the multicast source proxy logic is operably coupled to associate each multicast source proxy device in the list of multicast source proxy devices with priority information indicating a relative priority for the multicast source proxy device to be the designated multicast source proxy device, wherein the priority information comprises at least one of a predetermined metric preference value indicating a number of device hops from the multicast source proxy device to a multicast source for the (source, group) pair; and an Internet Protocol address for the multicast source proxy device; and forwarding logic responsive to the receiving logic and operably coupled to forward the multicast packet including the option field identifying the device.

13. The device of claim 12, comprising a border device in a routing domain.

14. The device of claim 13, comprising:

the forwarding logic operably coupled to forward the multicast packet including the option field, if the device is the designated multicast source proxy device for the (source, group) pair.

15. The device of claim 14, wherein the multicast packet is an interdomain multicast packet including an option field from another routing domain and wherein the multicast source. proxy logic is operably coupled to accept the multicast packet and remove the option field from the multicast packet.

16. The device of claim 14, wherein the multicast packet is an interdomain multicast packet including an option field from another network domain, and wherein the multicast source proxy logic is operably coupled to drop the multicast packet.

17. The device of claim 14, wherein the multicast packet is an intradomain multicast packet including an option field from another network domain, and wherein the multicast source proxy logic is operably coupled to accept the multicast packet and remove the option field from the multicast packet.

18. The device of claim 12, wherein the multicast source proxy logic is operably coupled to maintain an index entry for the (source, group) pair and a multicast source proxy entry for each multicast source proxy device.

19. The device of claim 18, wherein the multicast source proxy logic is operably coupled to create a multicast source proxy entry for the device.

20. The device of claim 18, wherein the multicast packet includes an option field identifying another multicast source proxy device in the network domain, and wherein the multicast source proxy logic is operably coupled to create a multicast source proxy entry for the other multicast source proxy device based upon the option field in the multicast packet.

21. The device of claim 12, wherein the multicast source proxy logic is operably coupled to elect as the designated multicast source proxy device the multicast source proxy device having the highest relative priority.

22. The device of claim 21, wherein the multicast source proxy logic is operably coupled to elect electing as the designated multicast source proxy device the multicast source proxy device having the lowest metric preference value, if only one multicast source proxy device has the lowest metric preference value; to elect as the designated multicast source proxy device the multicast source proxy device having the lowest metric preference value and the lowest metric, if more than one multicast source proxy device has the lowest metric preference value and only one multicast source proxy device has the lowest metric; and to elect as the designated multicast source proxy device the multicast source proxy device having the lowest metric preference value, the lowest metric, and the lowest Internet Protocol address, if more than one multicast source proxy device has the lowest metric preference value and the lowest metric.

23. The device of claim 12, wherein the multicast source proxy logic is operably coupled to determine that the designated multicast source proxy device for the (source, group) pair has failed and to insert the option field into the multicast packet, the option field including the device identifier identifying the device and further including an indicator indicating that the designated multicast source proxy device has failed.

24. The device of claim 12, comprising a security broker in a routing domain.

25. The device of claim 24, comprising:
the receiving logic operably coupled to receive the multicast packet;
decapsulating logic operably coupled to decapsulate the multicast packet;
decryption logic operably coupled to decrypt the decapsulated multicast packet; and
the forwarding logic operably coupled to forward the decrypted multicast packet including the option field identifying the device.

26. A program product comprising a computer readable medium having embodied therein a computer program for reducing forwarding states by a device in a network domain of a communication system, the computer program comprising:
receiving logic programmed to receive a multicast packet for a (source, group) pair, multicast source proxy logic programmed to determine whether to accept the multicast packet and to insert an option field into the multicast packet if the device is a designated multicast source proxy device for the (source, group) par; wherein the multicast source proxy logic is programmed to maintain a list of multicast source proxy devices for the (source, group) pair and determine the designated multicast source proxy device for the (source, group) pair from among the multicast source proxy devices in the list of multicast source proxy devices based upon a predetermined priority scheme wherein the multicast source proxy logic is programmed to associated each multicast source proxy device in the list of multicast source proxy devices with priority information indicating a relative priority for the multicast source proxy device to be the designated multicast source proxy device, wherein the priority information comprises at least one of a predetermined metric preference value indicating a number of device hops from the multicast source proxy device to a multicast source for the (source, group) pair, and an Internet Protocol address for the multicast source proxy device, and
forwarding logic responsive to the receiving logic and programmed to forward the multicast packet including the option field identifying the device.

27. The program product of claim 26, wherein the device is a border device in a routing domain.

28. The program product of claim 27, comprising:
the forwarding logic programmed to forward the multicast packet including the option field, if the device is the designated multicast source proxy device for the (source, group) pair.

29. The program product of claim 28, wherein the multicast packet is an interdomain multicast packet including an option field from another routing domain, and wherein the multicast source proxy logic is programmed to accept the multicast packet and remove the option field from the multicast packet.

30. The program product of claim 28, wherein the multicast packet is an interdomain multicast packet including an option field from another network domain, and wherein the multicast source proxy logic is programed to drop the multicast packet.

31. The program product of claim 28, wherein the multicast packet is an intradomain multicast packet including an option field from another network domain, and wherein the multicast source proxy logic is programmed to accept the multicast packet and remove the option field from the multicast packet.

32. The program product of claim 26, wherein the multicast source proxy logic is programmed to maintain an index entry for the (source, group) pair and a multicast source proxy entry for each multicast source proxy device.

33. The program product of claim 32, wherein the multicast source proxy logic is programmed to create a multicast source proxy entry for the device.

34. The program product of claim 32, wherein the multicast packet includes an option field identifying another multicast source proxy device in the network domain, and wherein the multicast source proxy logic is programed to create a multicast source proxy entry for the other multicast source proxy device based upon the option field in the multicast packet.

35. The program product of claim 26 wherein the multicast source proxy logic is programmed to elect as the designated multicast source Proxy device the multicast source proxy device having the highest relative priority.

36. The program product of claim 35, wherein the multicast source proxy logic is programed to elect electing as the designated multicast source proxy device the multicast source proxy device having the lowest metric preference value, if only one multicast source proxy device has the lowest metric preference value; to elect as the designated multicast source proxy device the multicast source proxy device having the lowest metric preference value and the lowest metric, if more than one multicast source proxy device has the lowest metric preference value and only one multicast source proxy device has the lowest metric; and to elect as the designated multicast source proxy device the multicast source proxy device having the lowest metric preference value, the lowest metric, and the lowest Internet Protocol address, if more than one multicast source proxy device has the lowest metric preference value and the lowest metric.

37. The program product of claim 26, wherein the multicast source proxy logic is programmed to determine that the designated multicast source proxy device for the (source, group) pair has failed and to insert the option field into the multicast packet, the option field including the device identifier identifying the device and further including an indicator indicating that the designated multicast source proxy device has failed.

38. The program product of claim 26, wherein the device is a security broker in a routing domain.

39. The program product of claim 38, comprising:
the receiving logic programmed to receive the multicast packet;
decapsulating logic programmed to decapsulate the multicast packet;
decryption logic programmed to decrypt the decapsulated multicast packet; and
the forwarding logic programmed to forward the decrypted multicast packet including the option field identifying the device.

40. A method for reducing forwarding states by an interior device in a network domain of a communication system, the method comprising:
receiving a multicast packet for the (source, group) pair, wherein the multicast packet includes an option field identifying a border device in the routing domain, and wherein the option field further includes a source mask for the (source, group) pair;
determining whether the (source, group) pair is under multicast source proxy control; and
determining whether to accept the multicast packet based upon a designated multicast source proxy device for the (source, group) pair, if the (source, group) pair is under multicast source proxy control.

41. The method of claim 40, wherein determining whether to accept the multicast packet comprises:
determining whether the border device is the designated multicast source proxy device for the (source, group) pair.

42. The method of claim 41, wherein determining whether the border device is the designated multicast source proxy device for the (source, group) pair comprises:
maintaining a list of multicast source proxy devices for the (source, group) pair; and
determining the designated multicast source proxy device for the (source, group) pair from among the multicast source proxy devices in the list of multicast source proxy devices based upon a predetermined priority scheme.

43. The method of claim 42, wherein maintaining the list of multicast source proxy devices for the (source, group) pair comprises:
maintaining an index entry for the (source, group) pair; and
maintaining a multicast source proxy entry for each multicast source proxy device.

44. The method of claim 43, wherein maintaining the list of multicast source proxy devices for the (source, group) pair comprises:
creating a multicast source proxy entry for the border device.

45. The method of claim 42, wherein each multicast source proxy device in the list of multicast source proxy devices is associated with priority information indicating a relative priority for the multicast source proxy device to be the designated multicast source proxy device, and wherein determining the designated multicast source proxy device for the (source, group) pair from among the multicast source proxy devices in the list of multicast source proxy devices comprises electing as the designated multicast source proxy device the multicast source proxy device having the highest relative priority.

46. The method of claim 45, wherein the priority information comprises at least one of:
a predetermined metric preference value;
a predetermined metric indicating a number of device hops from the multicast source proxy device to a multicast source for the (source, group) pair; and
an Internet Protocol address for the multicast source proxy device.

47. The method of claim 46, wherein determining the designated multicast source proxy device for the (source, group) pair from among the multicast source proxy devices in the list of multicast source proxy devices comprises:
electing as the designated multicast source proxy device the multicast source proxy device having the lowest metric preference value, if only one multicast source proxy device has the lowest metric preference value;
electing as the designated multicast source proxy device the multicast source proxy device having the lowest metric preference value and the lowest metric, if more than one multicast source proxy device has the lowest metric preference value and only one multicast source proxy device has the lowest metric; and
electing as the designated multicast source proxy device the multicast source proxy device having the lowest metric preference value, the lowest metric, and the lowest Internet Protocol address, if more than one multicast source proxy device has the lowest metric preference value and the lowest metric.

48. The method of claim 42, wherein the option field further includes an indicator indicating the designated multicast source proxy device has failed, and wherein determining whether to accept the multicast packet comprises:
removing the designated multicast source proxy device from the list of multicast source proxy devices for the (source, group) pair;
determining a new designated multicast source proxy device from among the remaining multicast source proxy devices in the list of multicast source proxy devices for the (source, group) pair; and
determining whether the border device is the new designated multicast source proxy device for the (source, group) pair.

49. The method of claim 41, comprising:
receiving the multicast packet including the option field identifying the border device in the routing domain;
determining that the border device is the designated multicast source proxy device for the (source, group) pair; and
accepting the multicast packet.

50. The method of claim 41, comprising:
receiving the multicast packet including the option field identifying the border device in the routing domain;
determining that the border device is not the designated multicast source proxy device for the (source, group) pair; and
dropping the multicast packet.

51. The method of claim 40, further comprising:

maintaining a source mask for the (source, group) pair; and updating the source mask for the (source, group) pair based upon the source mask in the option field of the multicast packet.

52. The method of claim 51, wherein updating the source mask for the (source, group) based upon the source mask in the option field of the multicast packet comprises:

setting the source mask for the (source, group) pair equal to the source mask in the option field of the multicast packet, if the source mask in the option field of the multicast packet is more specific than the source mask for the (source, group) pair.

53. The method of claim 40, wherein determining whether to accept the multicast packet comprises:

determining a metric for the interior device indicating a number of device hops from the interior device to a multicast source for the (source, group) pair;

determining the designated multicast source proxy device for the (source, group) pair;

determining a metric for the designated multicast source proxy device;

determining whether the metric for the interior device is better than the metric for the designated multicast source proxy device; and accepting the multicast packet, if the metric for the interior device is better than the metric for the designated multicast source proxy device.

54. The method of claims 40, further comprising:

forwarding the multicast packet by the interior device, if the interior device accepts the multicast packet.

55. A device for reducing forwarding states in a network domain of a communication system, the device comprising:

receiving logic operably coupled to receive a multicast packet for a (source, group) pair, wherein the multicast packet includes an option field identifying a border device in the network domain and wherein the option field further includes a source mask for the (source, group) pair; and multicast source proxy logic operably coupled to determine whether to accept the multicast packet based upon a designated multicast source proxy device for the (source, group) pair.

56. The device of claim 55, wherein the multicast source proxy logic is operably coupled to determine whether the border device is the designated multicast source proxy device for the (source, group) pair.

57. The device of claim 56, wherein the multicast source proxy logic is operably coupled to maintain a list of multicast source proxy devices for the (source, group) pair and determine the designated multicast source proxy device for the (source, group) pair from among the multicast source proxy devices in the list of multicast source proxy devices based upon a predetermined priority scheme.

58. The device of claim 57, wherein the multicast source proxy logic is operably coupled to maintain an index entry for the (source, group) pair and a multicast source proxy entry for each multicast source proxy device.

59. The device of claim 58, wherein the multicast source proxy logic is operably coupled to create a multicast source proxy entry for the border device.

60. The device of claim 57, wherein the multicast source proxy logic is operably coupled to associated each multicast source proxy device in the list of multicast source proxy devices with priority information indicating a relative priority for the multicast source proxy device to be the designated multicast source proxy device, and wherein the multicast source proxy logic is operably coupled to elect as the designated multicast source proxy device the multicast source proxy device having the highest relative priority.

61. The device of claim 60, wherein the priority information comprises at least one of:

a predetermined metric preference value;

a predetermined metric indicating a number of device hops from the multicast source proxy device to a multicast source for the (source, group) pair; and an Internet Protocol address for the multicast source proxy device.

62. The device of claim 61, wherein the multicast source proxy logic is operably coupled to elect as the designated multicast source proxy device the multicast source proxy device having the lowest metric preference value, if only one multicast source proxy device has the lowest metric preference value; to elect as the designated multicast source proxy device the multicast source proxy device having the lowest metric preference value and the lowest metric, if more than one multicast source proxy device has the lowest metric preference value and only one multicast source proxy device has the lowest metric; and to elect as the designated multicast source proxy device the multicast source proxy device having the lowest metric preference value, the lowest metric, and the lowest Internet Protocol address, if more than one multicast source proxy device has the lowest metric preference value and the lowest metric.

63. The device of claim 57, wherein the option field further includes an indicator indicating the designated multicast source proxy device has failed, and wherein the multicast source proxy logic is operably coupled to remove the designated multicast source proxy device from the list of multicast source proxy devices for the (source, group) pair, determine a new designated multicast source proxy device from among the remaining multicast source proxy devices in the list of multicast source proxy devices for the (source, group) pair, and determine whether the border device is the new designated multicast source proxy device for the (source, group) pair.

64. The device of claim 56, wherein the multicast source proxy logic is operably coupled to accept the multicast packet if the border device is the designated multicast source proxy device for the (source, group) pair.

65. The device of claim 56, wherein the multicast source proxy logic is operably coupled to drop the multicast packet if the border device is not the designated multicast source proxy device for the (source, group) pair.

66. The device of claim 55, wherein the multicast source proxy logic is operably coupled to maintain a source mask for the (source, group) pair and update the source mask for the (source, group) pair based upon the source mask in the option field of the multicast packet.

67. The device of claim 66, wherein the multicast source proxy logic is operably coupled to set the source mask for the (source, group) pair equal to the source mask in the option field of the multicast packet, if the source mask in the option field of the multicast packet is more specific than the source mask for the (source, group) pair.

68. The device of claim 55, wherein the multicast source proxy logic is operably coupled to determine a metric for the interior device indicating a number of device hops from the interior device to a multicast source for the (source, group) pair and to accept the multicast packet if the metric for the interior device is better than a metric for the designated multicast source proxy device.

69. The device of claim 55, further comprising:
forwarding logic responsive to the multicast source proxy logic and operably coupled to forward the multicast packet, if the interior device accepts the multicast packet.

70. A program product comprising a computer readable medium having embodied therein a computer program for reducing forwarding states by an interior device in a network domain of a communication system, the computer program comprising:
receiving logic programed to receive a multicast packet for a (source, group) pair, wherein the multicast packet includes an option field identifying a border device in the network domain and wherein the option field further includes a source mask for the (source, group) pair; and
multicast source proxy logic programmed to determine whether to accept the multicast packet based upon a designated multicast source proxy device for the (source, group) pair.

71. The program product of claim 70, wherein the multicast source proxy logic is programmed to determine whether the border device is the designated multicast source proxy device for the (source, group) pair.

72. The program product of claim 71, wherein the multicast source proxy logic is programmed to maintain a list of multicast source proxy devices for the (source, group) pair and determine the designated multicast source proxy device for the (source, group) pair from among the multicast source proxy devices in the list of multicast source proxy devices based upon a predetermined priority scheme.

73. The program product of claim 72, wherein the multicast source proxy logic is programmed to maintain an index entry for the (source, group) pair and a multicast source proxy entry for each multicast source proxy device.

74. The program product of claim 73, wherein the multicast source proxy logic is programmed to create a multicast source proxy entry for the border device.

75. The program product of claim 72, wherein the multicast source proxy logic is programmed to associated each multicast source proxy device in the list of multicast source proxy devices with priority information indicating a relative priority for the multicast source proxy device to be the designated multicast source proxy device, and wherein the multicast source proxy logic is programmed to elect as the designated multicast source proxy device the multicast source proxy device having the highest relative priority.

76. The program product of claim 75, wherein the priority information comprises at least one of:
a predetermined metric preference value;
a predetermined metric indicating a number of device hops from the multicast source proxy device to a multicast source for the (source, group) pair; and
a Internet Protocol address for the multicast source proxy device.

77. The program product of claim 76, wherein the multicast source proxy logic is programmed to elect as the designated multicast source proxy device the multicast source proxy device having the lowest metric preference value, if only one multicast source proxy device has the lowest metric preference value; to elect as the designated multicast source proxy device the multicast source proxy device having the lowest metric preference value and the lowest metric, if more than one multicast source proxy device has the lowest metric preference value and only one multicast source proxy device has the lowest metric; and to elect as the designated multicast source proxy device the multicast source proxy device having the lowest metric preference value, the lowest metric, and the lowest Internet Protocol address, if more than one multicast source proxy device has the lowest metric preference value and the lowest metric.

78. The program product of claim 72, wherein the option field further includes an indicator indicating the designated multicast source proxy device has failed, and wherein the multicast source proxy logic is programmed to remove the designated multicast source proxy device from the list of multicast source proxy devices for the (source, group) pair, determine a new designated multicast source proxy device from among the remaining multicast source proxy devices in the list of multicast source proxy devices for the (source, group) pair, and determine whether the border device is the new designated multicast source proxy device for the (source, group) pair.

79. The program product of claim 71, wherein the multicast source proxy logic is programmed to accept the multicast packet if the border device is the designated multicast source proxy device for the (source, group) pair.

80. The program product of claim 71, wherein the multicast source proxy logic is programmed to drop the multicast packet if the border device is not the designated multicast source proxy device for the (source, group) pair.

81. The program product of claim 70, wherein the multicast source proxy logic is programmed to maintain a source mask for the (source, group) pair and update the source mask for the (source, group) pair based upon the source mask in the option, field of the multicast packet.

82. The program product of claim 81, wherein the multicast source proxy logic is programmed to set the source mask for the (source, group) pair equal to the source mask in the option field of the multicast packet, if the source mask in the option field of the multicast packet is more specific than the source mask for the (source, group) pair.

83. The program product of claim 70, wherein the multicast source proxy logic is programmed to determine a metric for the interior device indicating a number of device hops from the interior device to a multicast source for the (source, group) pair and to accept the multicast packet if the metric for the interior device is better than a metric for the designated multicast source proxy device.

84. The program product of claim 70, further comprising:
forwarding logic responsive to the multicast source proxy logic and programmed to forward the multicast packet, if the interior device accepts the multicast packet.

85. A communication system comprising at least one forwarding device in communication with a number of interior devices, wherein the forwarding device forwards a multicast packet for a (source, group) pair, the multicast packet including an option field identifying the forwarding device and including a source mask for the (source, group) pair, and wherein each interior device forwards the multicast packet based upon at least the forwarding device identified in the option field of the multicast packet.

86. The communication system of claim 85; wherein each interior device determines a designated forwarding device from among the at least one forwarding device in the network domain and forwards the multicast packet if the forwarding device identified in the option field of the multicast packet is the designated forwarding device.

\* \* \* \* \*